(12) United States Patent
Yemelong et al.

(10) Patent No.: US 11,177,577 B2
(45) Date of Patent: Nov. 16, 2021

(54) PASSIVE REPEATER DEVICE, MICROWAVE NETWORK, AND METHOD OF DESIGNING A REPEATER DEVICE

(71) Applicant: 3M INNOVATIVE PROPERTIES COMPANY, St. Paul, MN (US)

(72) Inventors: Constand E. Yemelong, Austin, TX (US); Stephen P. LeBlanc, Austin, TX (US); Stephen C. King, Lakeway, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 161 days.

(21) Appl. No.: 16/475,165

(22) PCT Filed: Feb. 19, 2018

(86) PCT No.: PCT/US2018/018584
§ 371 (c)(1),
(2) Date: Jul. 1, 2019

(87) PCT Pub. No.: WO2018/156445
PCT Pub. Date: Aug. 30, 2018

(65) Prior Publication Data
US 2019/0363448 A1 Nov. 28, 2019

Related U.S. Application Data

(60) Provisional application No. 62/461,537, filed on Feb. 21, 2017.

(51) Int. Cl.
*H01Q 15/14* (2006.01)
*H01Q 3/46* (2006.01)
*H04B 7/145* (2006.01)

(52) U.S. Cl.
CPC ............ *H01Q 15/148* (2013.01); *H01Q 3/46* (2013.01); *H04B 7/145* (2013.01)

(58) Field of Classification Search
CPC ............ H01Q 15/14; H01Q 3/26; H04B 7/14
See application file for complete search history.

(56) References Cited

U.S. PATENT DOCUMENTS

| 2,977,464 A | 3/1961 | Engberg |
| 4,342,033 A | 7/1982 | De Camargo |
| (Continued) | | |

FOREIGN PATENT DOCUMENTS

WO    WO 2009-031957    3/2009

OTHER PUBLICATIONS

Pozar, "Design of millimeter wave microstrip reflectarrays", IEEE Transactions on antennas and propagation, 1997, vol. 45, No. 2.
(Continued)

*Primary Examiner* — Hasan Islam
(74) *Attorney, Agent, or Firm* — Michael Stern

(57) ABSTRACT

A repeater device comprises a periodic array of alternating metallic phase shifting elements, the array being periodic in at least one axis, formed on a first surface of a dielectric substrate, with an opposite surface of the dielectric substrate having a ground plane formed thereon, wherein each phase shifting element provides from 0° to 360° phase shifting in the microwave frequency range. The repeater device can be utilized in a microwave network.

15 Claims, 14 Drawing Sheets

(56) References Cited

U.S. PATENT DOCUMENTS

| | | | |
|---|---|---|---|
| 4,684,952 A | 8/1987 | Munson | |
| 6,795,020 B2* | 9/2004 | Sreenivas | H01Q 1/38 |
| | | | 343/700 MS |
| 6,885,355 B2* | 4/2005 | Killen | H01Q 15/02 |
| | | | 343/700 MS |
| 7,079,079 B2* | 7/2006 | Jo | H01Q 1/243 |
| | | | 343/700 MS |
| 8,149,179 B2 | 4/2012 | Crouch | |
| 8,217,847 B2 | 7/2012 | Sotelo | |
| 8,797,211 B2 | 8/2014 | Valdes-Garcia | |
| 9,966,647 B1* | 5/2018 | Swanson | H01Q 1/06 |
| 2008/0100116 A1 | 5/2008 | Orzelski | |
| 2009/0088071 A1* | 4/2009 | Rofougaran | H04B 7/15571 |
| | | | 455/13.1 |
| 2010/0001918 A1 | 1/2010 | Svensson | |
| 2012/0306698 A1* | 12/2012 | Warnick | H01Q 21/065 |
| | | | 342/372 |
| 2014/0152510 A1* | 6/2014 | Manry, Jr. | H01Q 9/0457 |
| | | | 343/700 MS |
| 2015/0087226 A1 | 3/2015 | Ling | |

OTHER PUBLICATIONS

International Search report for PCT International Application No. PCT/US2018/018584 dated May 31, 2018, 3 pages.

A 60ghZ Passive Repeater Array with Endfire Radiation Based on Metal Groove Unit-Cells, Duo Wang et al., 2015 $9^{th}$ European Conference on Antennas and Propagation (EuCAP), Lisbon, Portugal, pp. 1-4, published on Aug. 31, 2015.

* cited by examiner

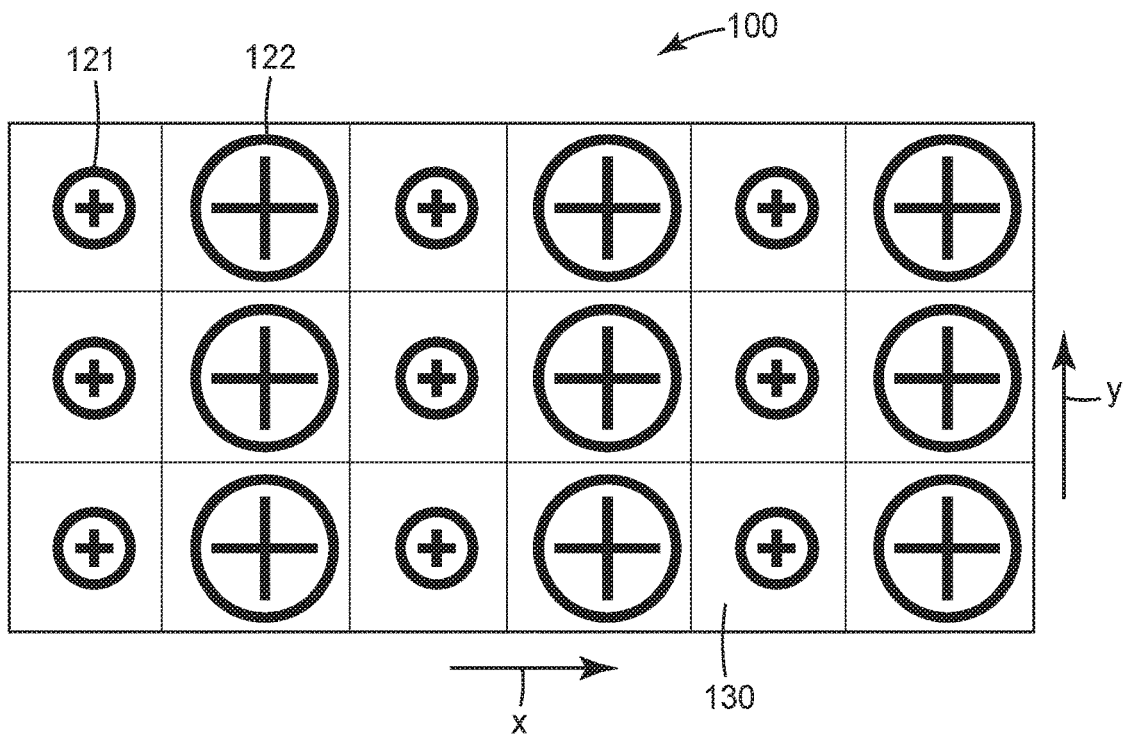
FIG. 1A
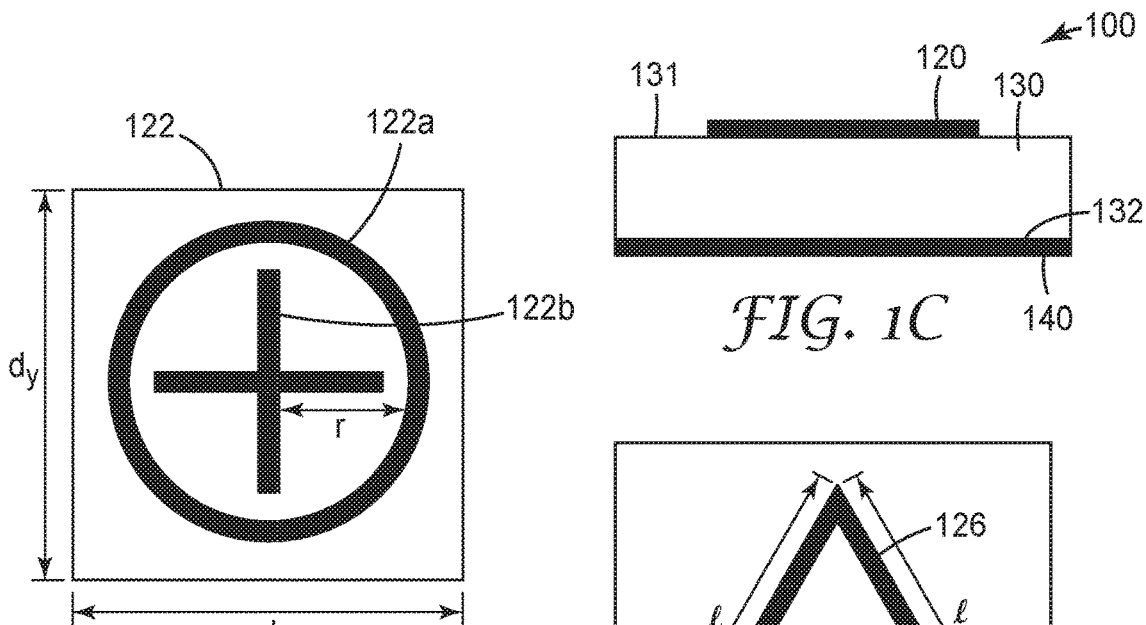
FIG. 1B
FIG. 1C
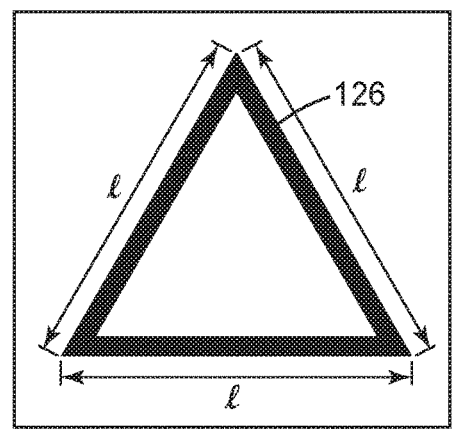
FIG. 1D

| 0 | 90 | 180 | 270 | 0 | 90 | 180 | 270 | 0 |
|---|----|-----|-----|---|----|-----|-----|---|
| 60 | 150 | 240 | 330 | 60 | 150 | 240 | 330 | 60 |
| 120 | 210 | 300 | 30 | 120 | 210 | 300 | 30 | 120 |
| 180 | 270 | 0 | 90 | 180 | 270 | 0 | 90 | 180 |
| 240 | 330 | 60 | 150 | 240 | 330 | 60 | 150 | 240 |
| 300 | 30 | 120 | 210 | 300 | 30 | 120 | 210 | 300 |
| 0 | 90 | 180 | 270 | 0 | 90 | 180 | 270 | 0 |
| 60 | 150 | 240 | 330 | 60 | 150 | 240 | 330 | 60 |
| 120 | 210 | 300 | 30 | 120 | 210 | 300 | 30 | 120 |
| 180 | 270 | 0 | 90 | 180 | 270 | 0 | 90 | 180 |
| 240 | 330 | 60 | 150 | 240 | 330 | 60 | 150 | 240 |
| 300 | 30 | 120 | 210 | 300 | 30 | 120 | 210 | 300 |
| 0 | 90 | 180 | 270 | 0 | 90 | 180 | 270 | 0 |
| 60 | 150 | 240 | 330 | 60 | 150 | 240 | 330 | 60 |
| 120 | 210 | 300 | 30 | 120 | 210 | 300 | 30 | 120 |
| 180 | 270 | 0 | 90 | 180 | 270 | 0 | 90 | 180 |
| 240 | 330 | 60 | 150 | 240 | 330 | 60 | 150 | 240 |
| 300 | 30 | 120 | 210 | 300 | 30 | 120 | 210 | 300 |
| 0 | 90 | 180 | 270 | 0 | 90 | 180 | 270 | 0 |

FIG. 7

PASSIVE REPEATER DEVICE, MICROWAVE NETWORK, AND METHOD OF DESIGNING A REPEATER DEVICE

BACKGROUND

Field of the Invention

The present invention is directed to a passive repeater device comprising a periodic array of phase shifting elements that can be utilized in a microwave network.

Related Art

Modern cellular networks comprise geographic areas of wireless signal coverage called macrocells. Within a macrocell, a base station enables cellular subscribers to connect to the core network and to communicate with other users or to access information on remote servers. With the availability and low cost of smartphones and portable computers, the volume of mobile data traffic on wireless networks is projected to continue to increase over the next several years. The increase in mobile data traffic is driven by bandwidth intensive high resolution video applications and services such as video content sites, gaming, and data, in addition to plain old voice communication.

When data, and particularly video, is transferred over a wireless channel, the quality of the received video will depend on the wireless channel bandwidth, the noise and interference in the cell, the distance between the base station and the mobile device, and the speed of the mobile device. When one or many of these impairments affects the wireless channel, one or more problems may arise (e.g., the video quality degrades, the video freezes, the internet page the subscriber wants to access fails to load, and the network is slow). These various issues lead to subscriber dissatisfaction and turnover.

To circumvent these issues, cellular service providers are deploying small cells. Small cells are smaller in physical area than macrocells. Many small cells may reside within a microcell. Small cells may be deployed in current and future generations of wireless networks to provide localized wireless coverage, improved communication capacity and quality of service. Small cells can be used to enhance wireless network quality at location where the base station signal is weak.

A small cell maybe installed on a lamppost at street level, on a rooftop of a building, on a telephone post, or on a wall of a building. A small cell requires a means to establish connectivity to the core network. This connectivity is referred to as small cell backhaul. Small cell backhaul uses several wired or wireless access technologies. Wired access technology maybe copper-based, such as DSL or DOCSIS, or fiber-based, such as fiber to the curb or fiber to the node.

When fiber or copper is not available to backhaul small cells, wireless backhaul can be used. Wireless backhaul can be deployed in frequency bands less than 6 GHz (sub-6 GHz) or in the microwave bands at a frequency in the range of 6 GHz to 100 GHz. Sub-6 GHz bands available for small cell backhaul have narrow bandwidth and may not enable small cell backhaul data rates greater than 1 Gbps.

Since higher data rates, e.g., greater than 1 Gbps, will be required for 5G backhaul, the use of higher frequency radio waves in the of 6 GHz to 100 GHz spectrum region, referred heretofore as microwaves or millimeter waves, or mmWaves, has been identified for small cell backhaul and wireless access. For example, the spectrum around 60 GHz offers more than 5 GHz of available unlicensed spectrum worldwide, and can support wireless access data rates greater than 1 Gbps. The spectrum in the 70/80 GHz, the so called E-Band, which offers 10 GHz of lightly licensed spectrum, can also support wireless access data rates greater than 1 Gbps.

It is understood in wireless communication link design that the received signal strength decreases with the distance between the transmitting and the receiving antennas, and the frequency of the signal. This physical phenomenon is called free-space path loss. For comparison, with all else being equal, a 60 GHz link will have a received signal strength 100 times weaker than a 6 GHz link. For this reason, microwave links require high gain antennas, with gain greater than 40 dBi, to produce a collimated narrow beam, with a beamwidth less than 1 or 2 degrees, to compensate for the free space path loss. These types of links are called line-of-sight microwave links. These links require careful alignment of the transmitting and receiving antennas to ensure good signal strength.

As mentioned above, small cells require connectivity to the core network. Connectivity can be established via fiber or copper cables. However in some cases, fiber may not be available at a particular location and city ordinances may prohibit trenching to pull fiber to the small cell location. Microwave backhaul becomes attractive because it provides greater bandwidth to accommodate 1 Gbps data rate. However still, a clear line of sight may not be available between the small cell backhaul antenna and the remote base station antenna. This situation may occur when the small cell is installed in a dense urban area with high rise buildings or other obstructions in the line of sight between a small cell antenna and a macro site antenna.

Therefore, a need exists for to provide a means to change the direction of a narrow microwave beam in order to avoid an obstruction and to establish microwave backhaul connectivity between a small cell and macro site.

As mentioned above, wireless data consumed and generated by mobile devices will continue to grow at a rapid rate for the foreseeable future. The next generation of cellular networks known as 5G is expected to deliver multi-Gbps data rates to mobile devices in emerging new mobile broadband applications such stream high definition content. The number of devices connected to these new wireless networks called the Internet of Things (IoT) is also expected to grow by several orders of magnitude.

Millimeter waves (mmWave), that is frequencies above 6 GHz to 100 GHz, are considered as an enabler for these 5G networks, because the greater bandwidth available in these higher frequencies can be used to achieve multi-Gbps data rates. Other enablers of high data rates are dense small cells, and new modulation techniques with higher bps/Hz. Unfortunately, higher frequencies suffer from increased propagation path loss; high shadowing path loss due for example to building blockage, trees, and other obstructions; and higher oxygen and water absorption. In addition, new modulation techniques will require high signal to noise ratio (SNR) in order to deliver high bps/Hz. As result of these impairments, mmWave links in the access portion of the networks, that is the connection between mobile devices and the cellular base stations, will need to use a Line-of-Sight (LOS) link, where highly directional antennas with high gain provide a focused beam directly to the mobile user. This LOS connection is used to compensate for the increased in path loss and signal degradations at mmWave frequencies. The LOS link also enhances the SNR of the link to deliver high bps/Hz.

Yet, in dense urban environment, the path between the rooftop access point where the cellular rooftop site is located and the mobile users at the street level may be blocked by another building or other obstacles, in such a way that there is no direct line of sight between the rooftop antenna and the mobile users. In these conditions, the mmWave link data rate will be severely degraded. Therefore a need exists to enhance the link between a cellular access base station and a mobile user in a way that a LOS-like link is established.

SUMMARY

According to an embodiment of the present invention, a repeater device comprises a periodic array of alternating metallic phase shifting elements, the array being periodic in at least one axis, formed on a first surface of a dielectric substrate, with an opposite surface of the dielectric substrate having a ground plane formed thereon, wherein each phase shifting element provides from 0° to 360° ($2n$) phase shifting in the microwave frequency range.

In another aspect, a first phase shifting element includes a first two-dimensional geometric structure and a second phase shifting element includes a second two-dimensional geometric structure, wherein the first and second two-dimensional geometric structures each have a similar shape, and wherein the first two-dimensional geometric structure has a different size than the second two-dimensional geometric structure.

In yet another aspect, the periodic array comprises an array of repeating trios of phase shifting elements in at least one axis, wherein a trio of phase shifting elements comprises a first phase shifting element having a first two-dimensional geometric structure, a second phase shifting element having a second two-dimensional geometric structure, and a third phase shifting element having a third two-dimensional geometric structure, wherein the first, second, and third two-dimensional geometric structures each have a similar shape, and wherein the first two-dimensional geometric structure has a different size than the second two-dimensional geometric structure and the third two-dimensional geometric structure has a different size than the first and second two-dimensional geometric structures.

In yet another aspect, the periodic array comprises at least P phase shifting elements each having a similar shape and different size provided in a repeating pattern, wherein P comprises an integer greater than 2.

According to another embodiment of the invention, a microwave network comprises one or more of the repeater devices described above.

According to yet another embodiment of the invention, a method of forming a passive repeater device for changing the direction of a beam or microwave radiation, comprises selecting values for a plurality of operating parameters of the repeater device, the operating parameters comprising frequency of operation, input angle ($\theta_i$, $\phi_i$), output angle ($\theta_o$, $\phi_o$), and a size N*dx times M*dy of the repeater device. A phase shifting element having dimensions dx and dy is provided, where dx and dy are less than or equal to half the wavelength of a frequency of operation, where the phase shifting element further provides a reflection phase shift variable from 0 to at least a when a geometric parameter of the phase shifting element is varied. An array is formed, where an array of N times M phase shifting elements are placed on a substrate to form the repeater device, wherein a phase shift provided by a respective phase shifting element at a given position in the array is selected such that the array redirects the beam of microwave radiation from an input angle ($\theta_i$, $\phi_i$) to an output angle ($\theta_o$, $\phi_o$).

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 1A is a schematic view of a repeater device according to an embodiment of the invention.

FIG. 1B is a close up view of an exemplary phase shifting element according to an embodiment of the invention.

FIG. 1C is a schematic side view of a repeater device according to an embodiment of the invention.

FIG. 1D is a close up view of another exemplary phase shifting element according to an embodiment of the invention.

FIG. 7 shows an example of the phase lattice for a two-dimensional passive repeater array, for the case of $\beta_{01} = \pi/3$ and $\beta_{10} = \pi/2$, with the array elements having a periodicity in both the x-axis and y-axis.

Figure 2A:
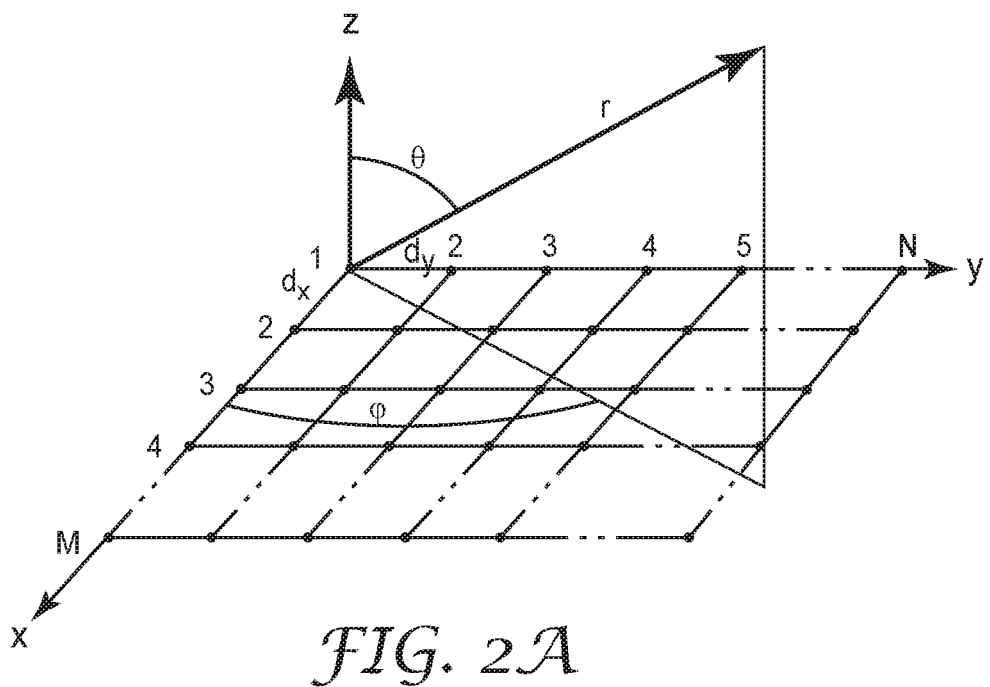
FIG. 2A is a basic representation of a 2-dimensional array of phase shifting elements in the (x, y) plane, with each phase shifting element represented by a point.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

An embodiment described herein is directed to a passive repeater device or network of devices that can connect a small cell to a macro site in a single hop or multiple hops. In addition, a method of developing passive devices for changing the direction of an incoming beam of radiation is disclosed. Moreover, the present description provides for the development of a new cellular network planning technique and deployment architecture, where passive repeater devices are judiciously installed in a network to provide for coverage and capacity, in particular in situations where there is no LOS (NLOS) between a Base Station access point and mobile users.

FIGS. 1A 1C show a first embodiment of the invention, a repeater device 100. The repeater device 100 comprises a periodic array of alternating phase shifting elements 121 and 122, being periodic in at least one axis, such as the x-axis. In this embodiment, repeater device 100 comprises a binary array of alternating phase shifting elements, with the phase shifting elements alternating along each row of the array in the x-axis direction. These two phase shifting elements can be selected such that the reflected phase of the field radiated by the first element is out of phase (e.g., in this case, a phase shift of 180 degrees or 7C radians) with the phase of the field radiated by the second phase shifting element.

While one embodiment of the repeater device 100 is designed to be utilized with microwave communications, the frequency range of the repeater device can be any frequency where electromagnetic radiation can occur in the atmosphere. Accordingly, various embodiments of the repeater device can be designed to operate with frequencies that include radio waves (of which microwaves are a part), but also visible light frequencies and some infrared frequencies.

In this case, each phase shifting element comprises a two-dimensional geometric structure, here a first two-dimensional structure 121 and a second two-dimensional structure 122, with each having substantially similar features in at least two dimensions, such as the x and y dimensions. The phase shifting elements are formed from a metal that is disposed on a first surface 131 of a dielectric substrate 130. The dielectric substrate 130 can be formed from a flexible film or rigid substrate. In addition, the first and second two-dimensional geometric structures each have the same, or at least a substantially similar, shape (in this embodiment, a plus sign formed in the center of a ring), but with different sizes. As shown in FIG. 1A, the first two-dimensional geometric structure 121 has a different (smaller) size than the second two-dimensional geometric structure 122. This pair of structures repeats along the x-axis for some number (N) times, depending on the size of the repeater device 100. The smaller phase shifting element 121 provides a reference phase, or 0°, and the larger phase shifting element 122 provides a phase shift of 180°.

In this example, each of the two dimensional geometric structures 121, 122 includes a "cross" or "plus sign" shaped structure, such as structure 122b, disposed in the central region of a ring 122a having a radius r (two-dimensional structure 122 is shown in more detail in FIG. 1B). As explained further herein, the radius r of the ring portion 122a is a parameter used to adjust the reflected phase changed by the phase shifting element.

Of course, in alternative embodiments, other two-dimensional shapes, such as the triangle shape 126 shown in FIG. 1D can be used. In this alternative example, the triangle sides each have an identical length 1. The length 1 is changed to cause a change in the phase shift of the field reflected by the element as discussed previously. A periodic array can be made of a smaller phase shifting elements to provide a reference phase, or 0° and the bigger phase shifting elements to provide a phase shift of 180°.

As shown in FIG. 1C, the metallic phase shifting elements are formed on a first surface 131 of a dielectric (insulating) substrate 130. An opposite surface 132 of the dielectric substrate 130 has a ground plane 140 formed thereon. The ground plane 140 can be formed from a suitable metal. The dielectric layer 130 can have a thickness of 0.25 mm to 1.25 mm. The ground plane 140 and the phase shifting elements 121 and 122 can have thickness of 5 microns to 35 microns. The phase shifting elements can be formed on the substrate using conventional photolithographic, chemical etching, and/or lamination processes, as would be understood by one of skill in the art given the present description.

In one example implementation, the repeater device 100 can be used in situations where the source antenna is located at large distance from the repeater device, perhaps a distance of about 50 m to about 150 m (that is the repeater device is in the far-field of the transmitting antenna). In addition, the repeater devices described herein can be used in situations where the source antenna has a high gain, or equivalently the source antenna radiates a narrow beam (less than 2 degrees beam-width). With these assumptions, the wave incident on the repeater device can be considered a plane wave, where a plane wave is a wave for which surfaces of constant phase are planes in the usual Cartesian 3-dimensional space. As such, repeater device 100 can perform as a passive plane wave repeater device providing substantial non-specular reflection of microwave signals.

In addition, according to one embodiment, the repeated device 100 is designed to be used as a passive device, without the need for using electrical power during operation. However, in an alternative embodiment, the repeater device can be include a tunable dielectric material to create a phase shifting element whose properties can be adjusted. In this alternative aspect, a battery or other power source could be coupled to the repeater device, whereby a change of power (e.g., battery voltage) could be used to change the repeater device response.

In another alternative aspect, a repeater device can be formed with materials that would be substantially transparent to visible light so that the device could be placed on a window. The phase shifter elements and ground place could be formed from a suitable transparent conductor, such as a fine metal mesh conductor or a transparent conducting oxide such as indium tin oxide (ITO). The dielectric material between the phase shifter elements and ground plane can be made from a transparent dielectric material like PET, polycarbonate, or polymethyl methacrylate, and the entire transparent construction can be adhered to the window with, e.g., an optically clear adhesive.

Figure 12A:
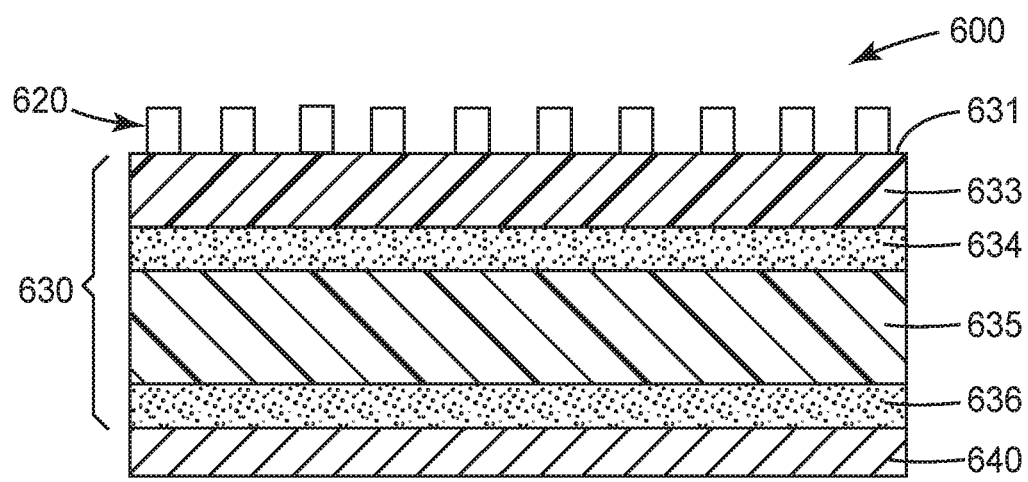
FIG. 12A is a schematic side view of a stretchable repeater device according to another embodiment of the invention.

In another alternative aspect, a repeater device can be formed on a stretchable dielectric substrate, such as a rubber-based material. By stretchable, it is meant that the material can be stretched to change its length and/or width, for example, by 30%, or 10%, or 5%, or 1%. For example, FIG. 12A shows a repeater device 600 having metallic phase shifting elements 620 formed on a first surface 631 of a dielectric (insulating) substrate 630. In this aspect, the dielectric substrate 630 comprises a multilayer structure that includes a stretchable dielectric material 633, applied via adhesive layer 634 to a more rigid substrate layer 635, formed from a material such as a PET material. In use, the stretchable dielectric can be adjusted to alter the output angle of the reflected beam(s). In this manner, the phase shifting elements can be formed from a metallic material applies onto the stretchable dielectric material 633. The stretchable layer 633 can be stretched to a desired length and/or width prior to application to the more rigid substrate layer 635. A ground plane 640 can be adhered to an opposite surface of substrate 630 via a second adhesive layer 636. The ground plane 640 can be formed from a suitable metal. The dielectric layer 630 can have a thickness of 0.25 mm to 1.25 mm. The ground plane 640 and the phase shifting elements 620 can have thickness of 5 microns to 35 microns.

Figure 12B:
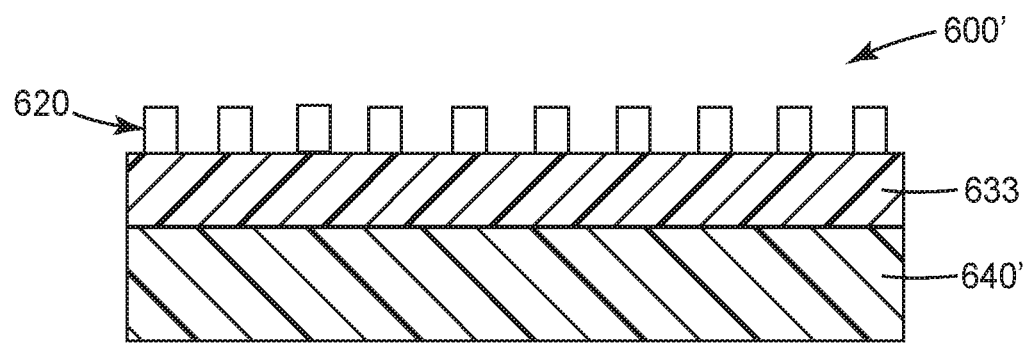
FIG. 12B is a schematic side view of a stretchable repeater device according to another embodiment of the invention.

In a further alternative aspect, such as shown in FIG. 12B, a repeater device 600' having phase shifting elements 620 can be formed on a stretchable dielectric substrate 633, such as a rubber-based material, but without requiring a secondary, more rigid, substrate layer. A ground plane 640' can be formed onto an opposite surface of stretchable substrate 633, e.g., via adhesive or lamination. In this alternative aspect, both the phase shifting elements and the ground layer can be formed from a stretchable, conductive cloth or fabric material. Example stretchable cloth materials include silver coated fabric (e.g., MedTex 130, available from Statex.de). The repeater device 600' can be placed onto an outer frame that can be mounted to a mounting structure, such as a building wall, pole, or other suitable structure.

Figure 13:
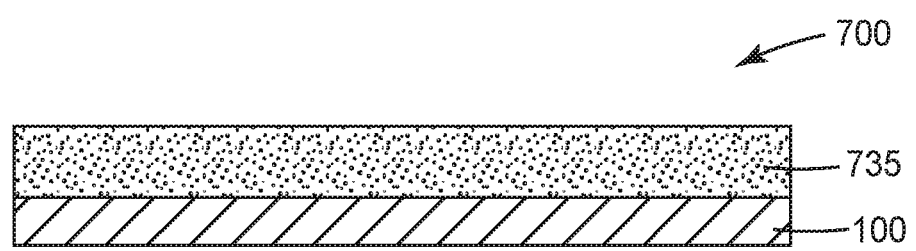
FIG. 13 is a schematic side view of a repeater device having a concealment layer according to another embodiment of the invention.

Optionally, in a further alternative aspect, the repeater devices described herein can further include a concealment layer to improve the aesthetics/appearance of the device as observed. For example, FIG. 13 shows a repeater device 700 having a concealment layer 735 disposed on an outer surface of a repeater device, such as repeater device 100 described above. The concealment layer can comprise a non-conductive material having low dissipation and a low dielectric constant. The concealment layer 735 can comprise a material such as a PET laminate or other polyester film (such as 3M 1080 Wrap Film or 3M Conceal Film, available from 3M Company). The concealment layer can allow the repeater device to better blend into its surroundings, without substantially reducing the strength of the incident and reflected microwave beams.

In basic operation, the repeater device 100 is illuminated by an incident wave. The wave induces current on the phase shifting elements. Each phase shifting element re-radiates a secondary wave, albeit with a designed phase shift. The secondary waves emanating from each of the phase shifting elements will interfere to produce a primary beam pointing to a direction for which the repeater is designed; based on the properties a wavefront phase manipulation to create constructive interference in a given direction.

With this design, the repeater device 100 can be utilized in a microwave network, and can provide non-specular reflection of microwave signals for access and backhaul applications for communications. For example, the repeater device 100 can provide a device that reflects microwave radiation at an angle different from the specular angle (in other words, the repeater device is a non-specular reflector). Furthermore, the repeater device 100 can be utilized in applications where it is desirable to have the ability to tune the direction of the reflected beam to the desired angle during the installation or construction of the small cell backhaul. In addition, the repeater device 100 can be utilized in applications where it would be desirable to have the ability to customize the repeater device after manufacturing, in a manner that it can provide for a redirection angle provided by a customer. As will be explained herein, a repeater device 100 can be designed to enable microwave communication for any number of specific applications.

For example, as mentioned above, in the wireless industry, small cells are being considered as a key enabling technology for future 5G networks. Small cells will be used to supplement macro cell coverage, to enable wireless capacity in excess of a gigabit per second of data rate. While fiber access is an accepted backhaul method, a significant portion of small cells will require wireless "line-of-sight" (LOS) connection between the small cell backhaul antenna and the macro site base station access node. In many other cases, there will be an obstruction between in the line of sight between the small cell backhaul antenna and the access node. The repeater device solutions provided herein can enable microwave backhaul when there is no line of sight between the small cell and the access node.

Conventional metallic mirrors are also used for repeater devices when the line of sight is obstructed. These metallic mirror repeater devices redirect a narrow beam and can establish wireless backhaul to a small cell. A drawback of these metallic mirrors used as microwave relay/repeater is that the angle of incidence is equal to the angle of reflection. Accordingly, conventional microwave passive repeaters are not well suited for situations in which the angle of incidence needs to be different from the reflection angle.

Referring back to FIG. 1B, in one example, the two dimensional structure 122 can comprise a square with dimensions dx=2.5 mm and dy=2.5 mm or half wavelength at an operating frequency of 60 GHz. A metal trace having a width of about 100 μm is printed on the top layer 131 of the dielectric substrate 130. The metal trace can have a thickness of about 5 microns to about 35 microns. The dielectric substrate can comprise a material having a dielectric constant of about 3, such as RO3003 or RO5350, commercially available from Rogers Corporation. The bottom (opposite) layer 140 comprises a solid metallic ground plane. The change in phase shift is accomplished by varying the size parameter r, which is the inner radius of the ring 122a. In this example, the distance between the ring 122a and the cross 122b is about 50 µm to about 125 µm.

Figure 3A:
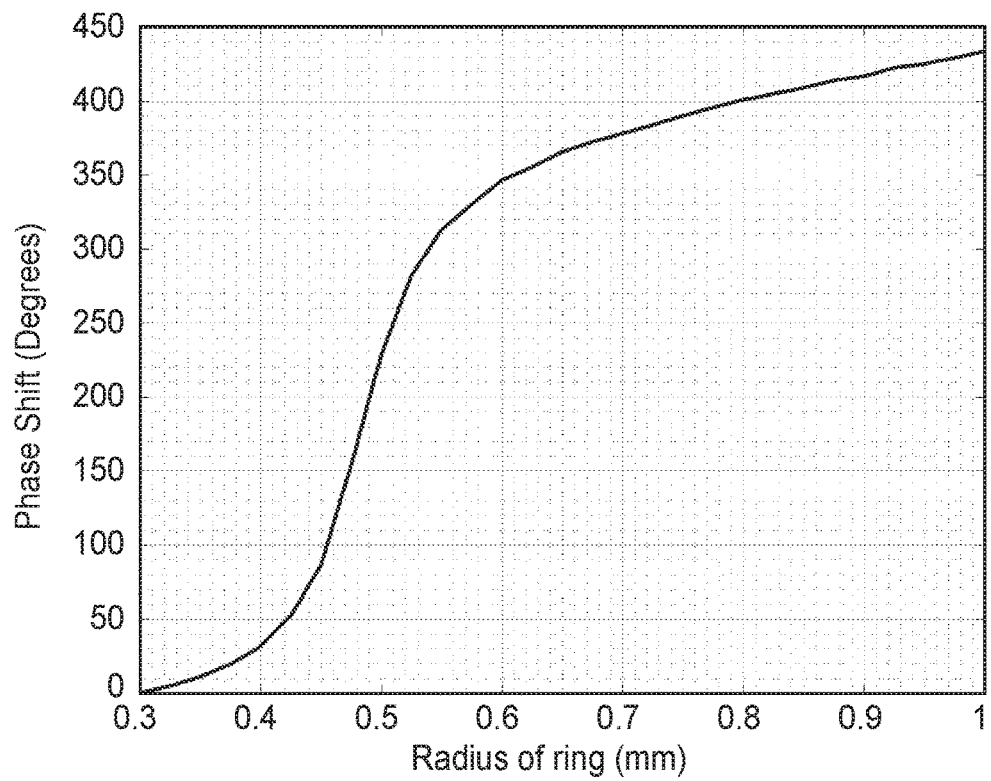
FIG. 3A is a graph showing the reflection phase response of an exemplary two-dimensional phase shifting structure.
Figure 3B:
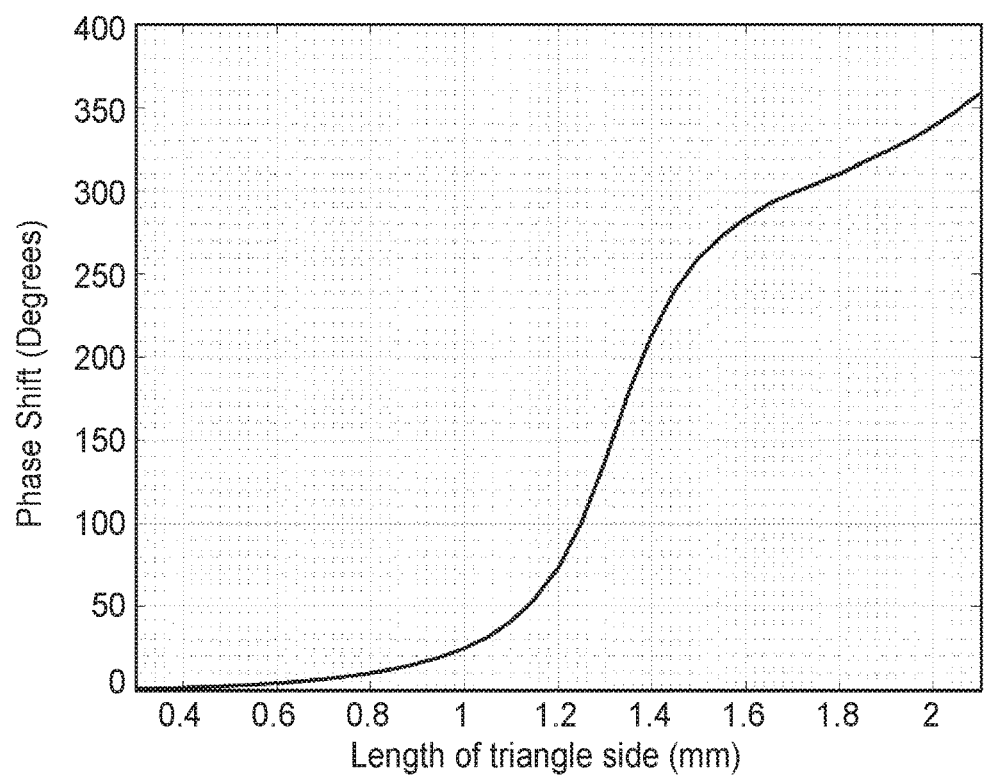
FIG. 3B is a graph showing the reflection phase response of an alternative two-dimensional phase shifting structure.

FIG. 3A shows the reflection phase response of the exemplary two-dimensional structure 122 and FIG. 3B shows the reflection phase response of the alternative two-dimensional structure 126. One aspect in the design of the repeater device 100 is that the reflection phase response of the phase shifting element varies from 0 to a minimum of $2\pi$ when a size characteristic of the phase shifting element changes. When this requirement is met, one can synthesize a passive repeater which for a given frequency of operation will redirect a beam incident from a first angle of incidence and exit at a given second reflected angle. Another property to note is that the phase response will vary with frequency, the consequence is that the redirected reflected angle will have drifted by some amount when the input frequency differs from the given frequency of operation. It is also noted that when using a low loss dielectric substrate such as R03003, with loss tangent of 0.003, the dielectric loss is negligible.

As shown in FIG. 1A, the repeater device 100 can be represented as 2-dimensional array of phase shifting elements 121, 122 in the (x, y) plane. FIG. 2A shows a more basic representation, with each phase shifting element can represented by a point. The origin in this coordinate system is the first phase shifting element denoted as 1. The array has N rows and M columns for a total of N×M phase shifting elements. Phase shifting elements are separated by dx units of length in the x direction and by $d_y$ units of length in the y-direction. A phase shifting element with an index nm, has coordinates $(n.d_x, m.d_y)$. A direction, or angle of incidence in this space is a pair of angles $(\theta, \phi)$, defined as shown in FIG. 2A.

In the description that follows, symbol $\lambda$ represents the wavelength of the wave incident on the repeater device. It is known that wavelength is given by the speed of light divided by the frequency of the wave incident of the repeater device. A plane wave propagating along a direction $(\theta, \phi)$ can be characterized by the wavevector k, and a vector $E_0$, which describes the electric field of the wave; where k is given as:

$$k = \frac{2\pi}{\lambda}(sin\theta cos\phi \cdot x + sin\theta sin\phi \cdot y + cos\theta \cdot z) \quad (EQ. 1)$$

where x, y, and z are axis vectors in Cartesian coordinates. The electric field of this wave, at a positon r is then given by:

$$E(r) = E_0 e^{jk \cdot r} \quad (EQ.2)$$

where j is the imaginary complex number.

A plane wave incident on the repeater device will have a direction or angle of incidence denoted by $(\theta_o, \phi_o)$; and the reflected wave will have direction $(\theta_o, \phi_o)$. The electric field incident on the repeater device is given as $E_{inc}$, and the electric field incident on the phase shifting element nm, located at position rte, of coordinates $(n.d_x, m.d_y)$ is given as:

$$E_{inc}(r_{nm}) = E_0 e^{\frac{2\pi}{\lambda} j(sin\theta_i cos\phi_i \cdot nd_x + sin\theta_i sin\phi_i \cdot md_y)} \quad (EQ. 3)$$

This incident field is reflected by the phase shifting element; and upon this reflection the phase shifting element impresses both a change in phase shift $\beta_{nm}$ and a change in amplitude onto the electric field. The element can be designed such that the change in the reflected amplitude of the electric field is negligible because the dielectric material upon which the phase shifting element is formed has a low loss. Therefore, the field reflected $E_{ref}$ by the phase shifting element, at position rte, of coordinates $(n.d_x, m.d_y)$, is obtained by modifying EQ.3 to include the phase shift term $\beta_{nm}$:

$$E_{ref}(r_{nm}) = E_0 e^{\frac{2\pi}{\lambda} j(sin\theta_i cos\phi_i \cdot nd_x + sin\theta_i sin\phi_i \cdot md_y) + j\beta_{nm}} \quad (EQ. 4)$$

EQ.4 defines the electric field on the surface of the repeater device immediately after reflection. A simplification made for this analysis is that the electric field is 0 at all other points of the repeater device surface except those points where the phase shifting elements are located.

The electric field with wavevector k in direction $(\theta_o, \phi_o)$ far away from the repeater device can be determined. It is known in phased array theory that the electric field radiated in the direction $(\theta_o, \phi_o)$ is the sum of the electric fields from the phase shifting elements with a phase term applied to account for the difference in position of the phase shifting elements.

The electric field along a direction (On, to), denoted as E $(\theta_o, \phi_o)$ is given as:

$$E(\theta, \phi) = \Sigma_{nm} E_{ref}(r_{nm}) e^{-jkr_{nm}} \quad (EQ.5)$$

Substituting EQ.1 and EQ.4 into EQ.5 yields $$(EQ. 6)$$

$$E(\theta_o, \phi_o) =$$
$$\sum_{nm} E_0 e^{\frac{2\pi}{\lambda} j(sin\theta_i cos\phi_i \cdot nd_x + sin\theta_i sin\phi_i \cdot md_y - sin\theta_o cos\phi_o \cdot nd_x - sin\theta_o sin\phi_o \cdot md_y) + j\beta_{nm}}$$

The condition to maximize the field in the direction (On, to), the argument of the exponent in EQ.6 is 0 or an integer multiple of $2\pi$. Therefore the require phase at the phase shifting element nm positioned at $(n.d_x, m.d_y)$ is:

$$(EQ. 7)$$

$$\beta_{nm} =$$
$$\frac{2\pi}{\lambda}(sin\theta_o cos\phi_o \cdot nd_x + sin\theta_o sin\phi_o \cdot md_y - sin\theta_i cos\phi_i \cdot nd_x - sin\theta_i sin\phi_i \cdot md_y)$$

Once the phase shifts $\beta_{nm}$ is provided, the matching ring radius can be determined by using the reflection phase shift curve of FIG. 3. Thus, one can synthesize a repeater device array, which changes the direction of an incident plane wave from a direction $(\theta_i, \phi_i)$ to a direction $(\theta_o, \phi_o)$. Finally, to minimize secondary lobes, $d_x$ and $d_y$ can be both less than half a wavelength at the frequency of interest.

Looking back at FIG. 1A, it is shown that along the x-direction, the same element repeats after 2 steps; that is, along the x-direction the array is periodic with a period 2. Looking back at FIG. 1A, it is shown that along the y-direction, the same element repeats; that is, along the y-direction the array is periodic with period 1. We refer to this array as a (2,1) periodic array, or a periodic array of order (2,1); where the first number "2" is the periodicity of the array along the x-direction and the second number "1" is the periodicity along the second y-direction.

A periodic array of order (p, q) is a planar array of phase shifting elements, such that p is the periodicity along the x-direction and q is the periodicity along the y-direction;

where p and q are natural numbers (positive whole numbers). The phase increment, or phase change, or phase step, along the x-direction is $2\pi/p$; and the phase increment, or phase change, or phase step, along the y-direction is $2\pi/q$.

Figure 2B:
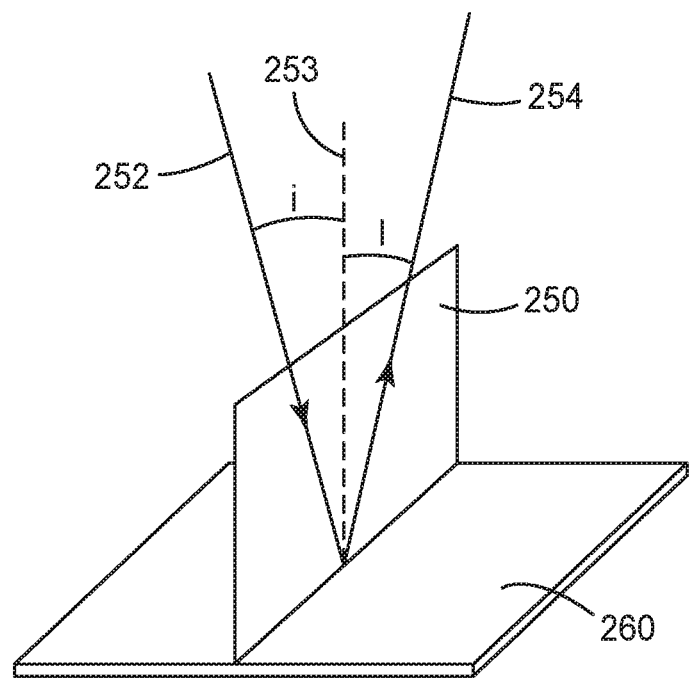
FIG. 2B is a simplified illustration of a redirected beam that lies in the plane of incidence.

As a further illustration, it can be limited, for these examples and for simplicity, to the case where the redirected beam lies in the plane of incidence as shown in FIG. 2B, then to the generalized 2D case. The plane of incidence 250 in this example is the plane formed from the incident wavevector 252 and the normal 253 to the repeater device 260 (herein, the terms "passive repeater," "reflector," "periodic reflector," "microwave repeater," "repeater array," and "periodic array" are used interchangeably with "repeater device"). When the reflected beam 254 lies in the plane of incidence, the incident and redirected directions are given as: $(\theta_o, \phi_o)=(\theta_o, 180)$ and $(\theta_i, \phi_i)=(\theta_i, 0)$. For this case, the elements of the array changes across the x-direction and the elements remain identical along the y-direction. The repeater device of FIG. 1A is a periodic array of order (2,1): the phase increment, or phase change, or phase step, from a first phase shifting element to second adjacent phase shifting element along the x-direction is $\beta_0=2\pi/2=\pi$ radians and the phase shift is a or 0 radians along the y-direction. For a (p,1) array, the phase change from one element to the next along the x-direction is $\beta_0=2\pi/p$, and from EQ.7:

$$\beta_0 = \frac{2\pi d}{\lambda}(\sin\theta_o + \sin\theta_i) \quad \text{(EQ. 8)}$$

where dx=dy=d.

Replacing $\beta_0$ by $2\pi/p$ in EQ. 8, gives:

$$\frac{\lambda}{pd} = \sin\theta_o + \sin\theta_i \quad \text{(EQ. 8.1)}$$

A (2,1) periodic array (such as shown in FIG. 1A) has $\beta_0=\pi$, and the array repeats after 2 elements (where the array shown in FIG. 1A is also referred to herein as a binary periodic array).

Figure 5:
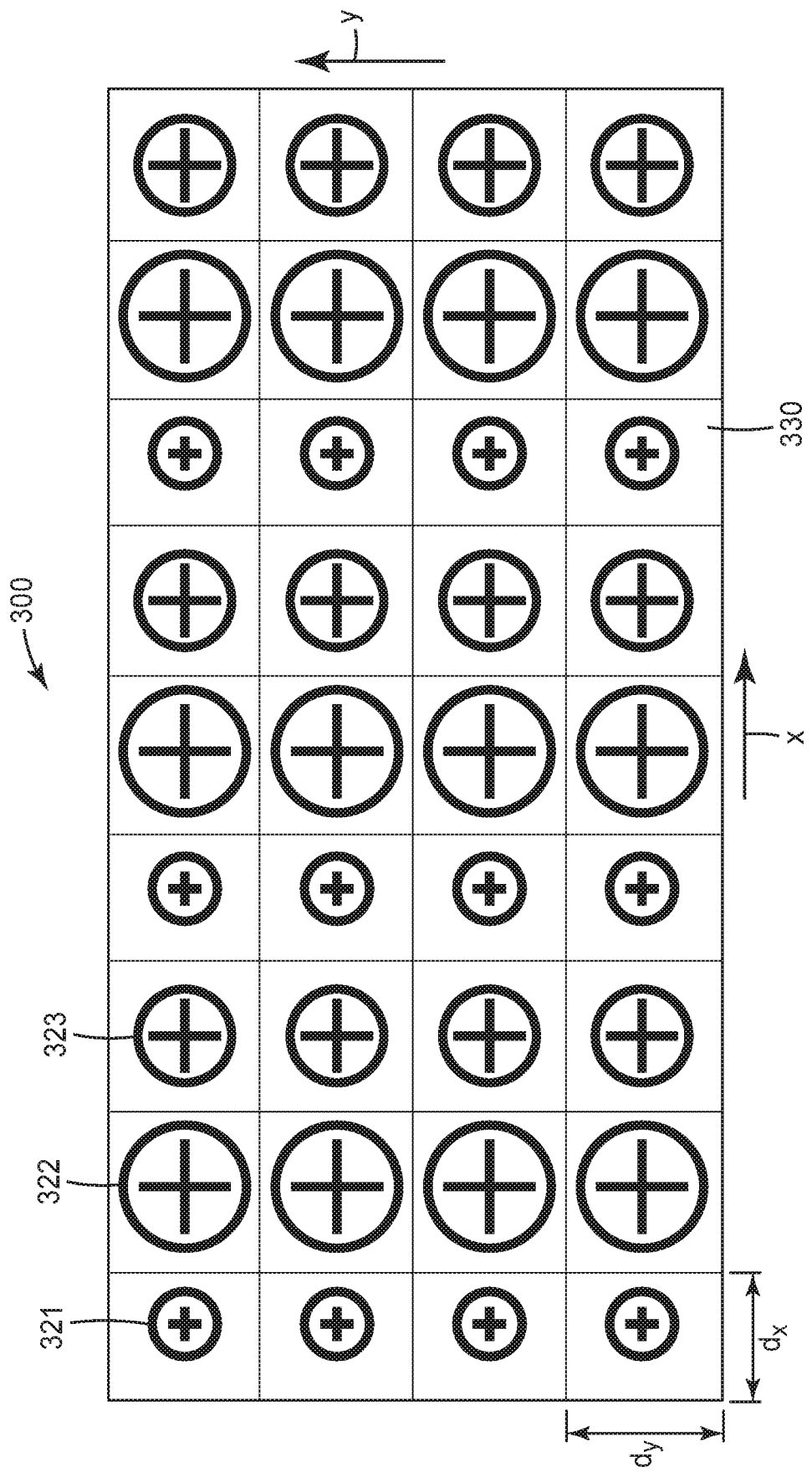
FIG. 5 is a schematic view of a repeater device according to another embodiment of the invention.

In another embodiment, FIG. 5 shows a ternary array, where $\beta_0=2\pi/3$, and the array repeats after 3 elements along the x-direction. For a quaternary array, $\beta_0=\pi/4$, and the array repeats after 4 elements along the x-direction. When, $\beta_0=2\pi/5$, and the array repeats after 5 elements.

Referring to EQ.8 again, once $\beta_0$ and d are selected along with the wavelength of the frequency of operation, many pairs of input and output angles exist which satisfy EQ.8. Thus a single passive repeater can be used with many pairs of input and output angles.

Referring back to FIG. 1A, repeater device 100 comprises a binary array of two alternating phase shifting elements. These two phase shifting elements are selected such that the reflected phase of the field radiated by the first element is out of phase (phase shift of $\pi$ radians) with the phase of the field radiated by the second element. In this binary repeater device, for given a distance d between phase shifting elements there is family of input and output angles the binary repeater devices will synthesize. Referring back to EQ. 8.1, for this binary array, the input angle $\theta_i$ and the output angle satisfies the equation:

$$\frac{\lambda}{2d} = \sin\theta_o + \sin\theta_i \quad \text{(EQ. 9)}$$

Figure 4A:
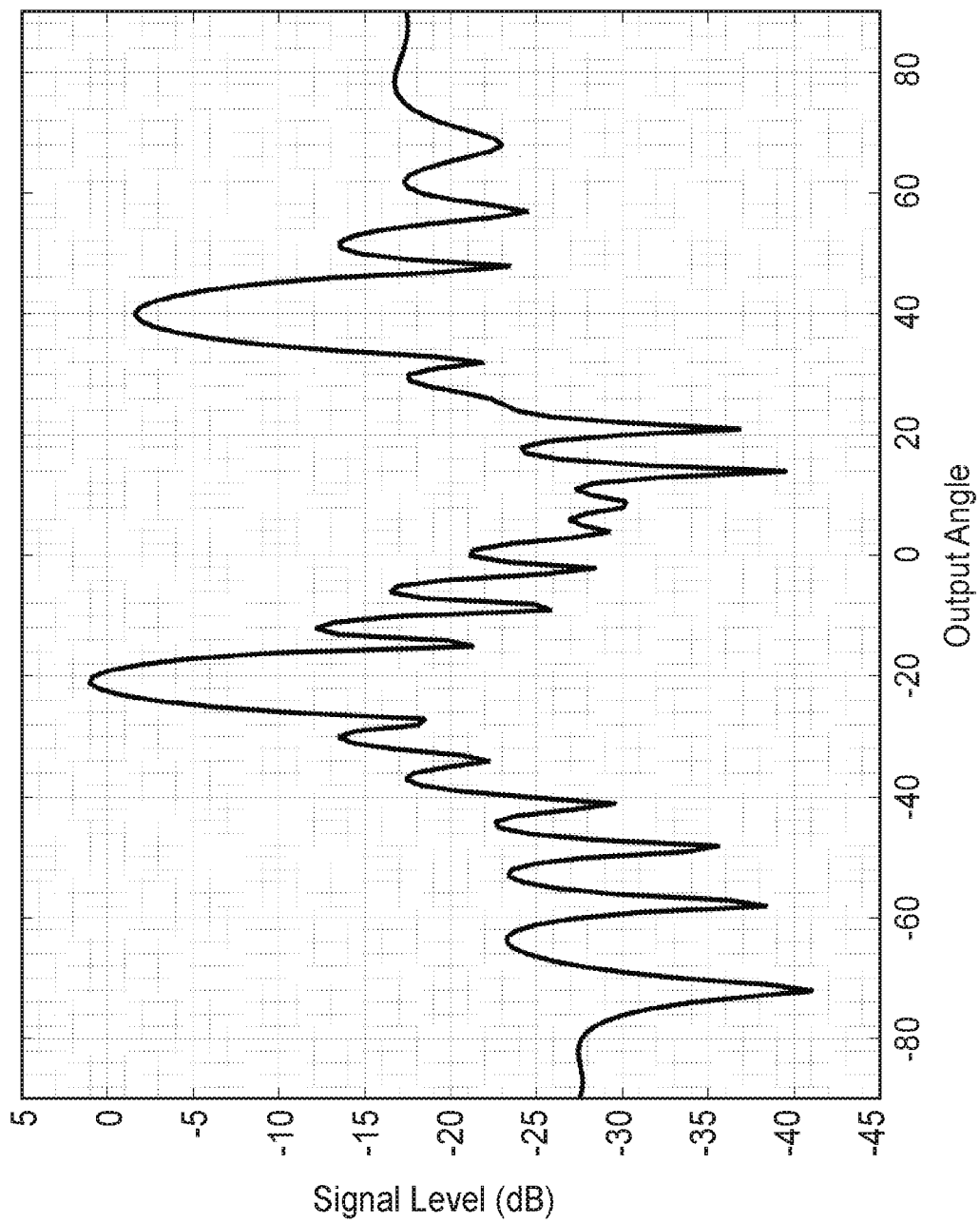
FIG. 4A is a graph showing a reflective pattern of an exemplary binary array for an incidence angle of 73 deg.
Figure 4B:
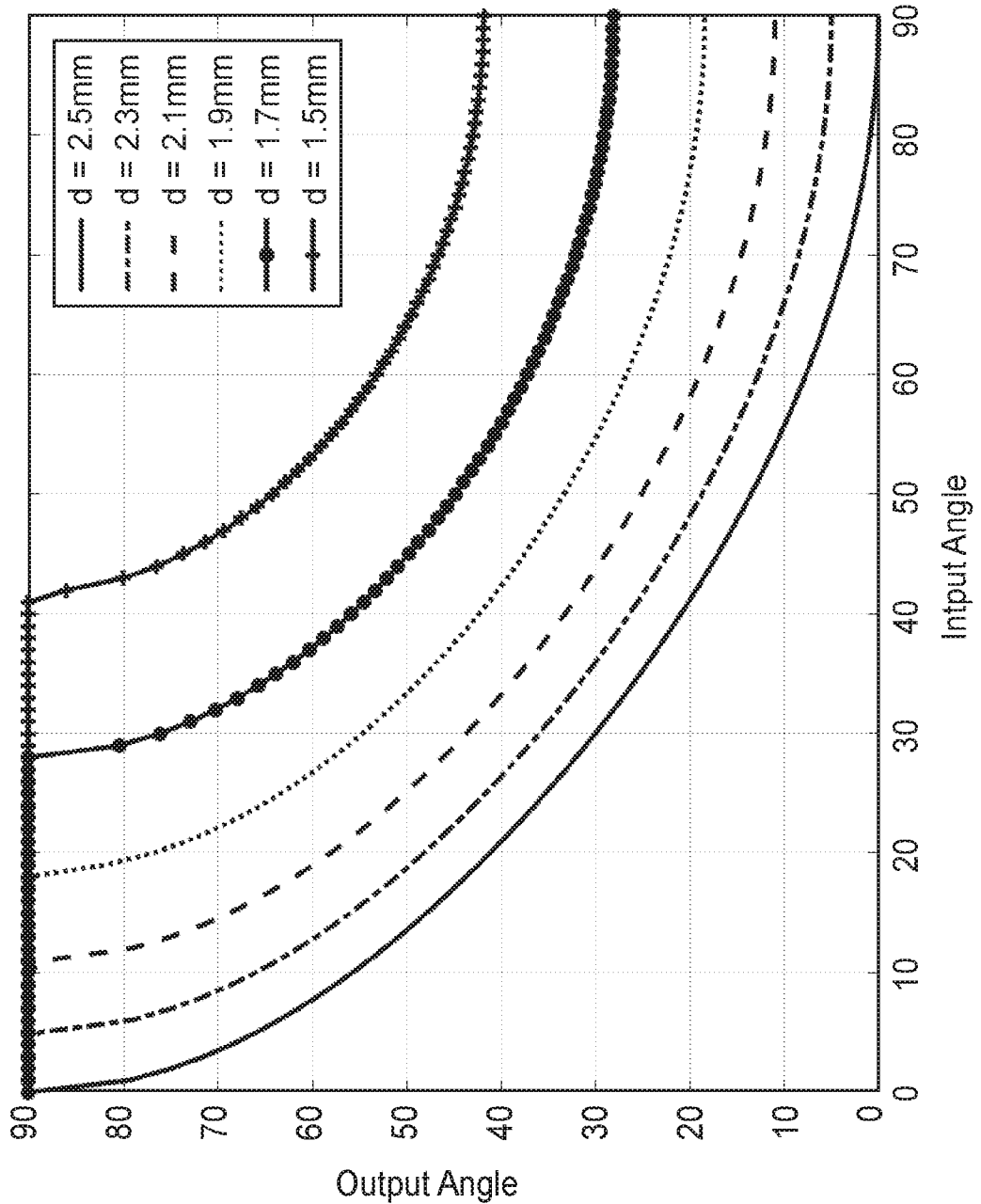
FIG. 4B is a graph showing the locus of angles for various element spacing for an exemplary binary array, for the condition $\beta_o = \pi$.

This feature is shown in FIG. 4B, which shows the locus of angles for various element spacing for a binary array. For example, if the elements spacing d is equal to 2.5 mm, and the input angle or angle of incidence onto the repeater device array is 40°, then the reflected angle or output angle is found on the 2.5 mm curve as 21°.

FIG. 5 shows another embodiment of the invention, a repeater device 300. The repeater device 300 comprises a periodic array of phase shifting elements, being periodic in at least one axis, such as the x-axis. In this embodiment, repeater device 300 comprises a ternary array of a trio different phase shifting elements 321, 322, 323, with the trio of phase shifting elements repeating along each row of the array in the x-axis direction. Each of individual phase shifting elements comprises a two-dimensional structure, with each having substantial features in at least two dimensions, such as the x and y dimensions. The phase shifting elements are formed from a metal that is disposed on a first surface of a dielectric substrate 330, similar to the construction shown in FIG. 1C, with a ground plane backing the substrate 330. In addition, the three different two-dimensional geometric structures each have the same, or at least a substantially similar, shape (in this embodiment, a plus sign formed in the center of a ring), but with different sizes. As shown in FIG. 5, the first two-dimensional geometric structure 321 has a different (smaller) size than the second two-dimensional geometric structure 322, which has a different (larger) size than the third two-dimensional geometric structure 323, which itself is larger than the first two-dimensional geometric structure 321. In this example ternary array structure, the operating frequency can be 60 GHz, with the phase shifting elements 321, 322, 323 having respective ring radii of 0.315 mm, 0.685 mm and 0.645 mm.

In one embodiment, these three phase shifting elements are selected such that the first element provide reflected phase shift of 0, the second element introduces $2\pi/3$ of phase shift (i.e., $\beta_0=2\pi/3$) and the third element introduces $4\pi/3$. In another embodiment of a ternary repeater device, the first element can provide a nominal phase shift of 0, the second element introduces $4\pi/3$ of phase shift (i.e., $\beta_o=2\pi/3$) and the third element introduces $2\pi/3$ of phase shift. In a ternary repeater device, just as in the binary repeater device described above, for given a distance d between phase shifting elements, there is a family of input and output angles a ternary repeater device will synthesize. This attribute is shown in FIGS. 8 and 9 for the alternative ternary repeaters described above.

Figure 8:
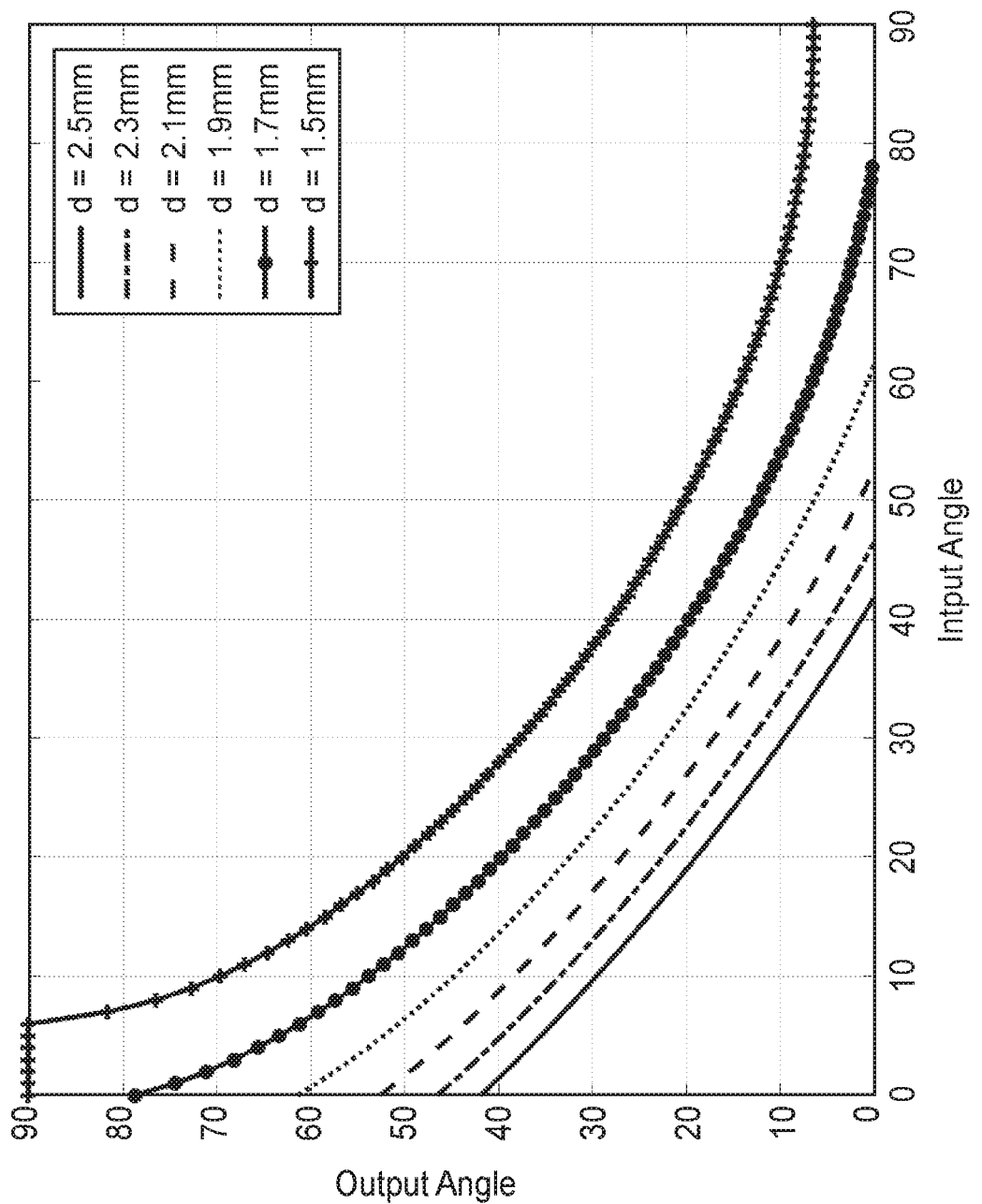
FIG. 8 is a graph showing the locus of angles for various element spacing for the first type ternary array with an incremental phase shift of $2\pi/3$.
Figure 9:
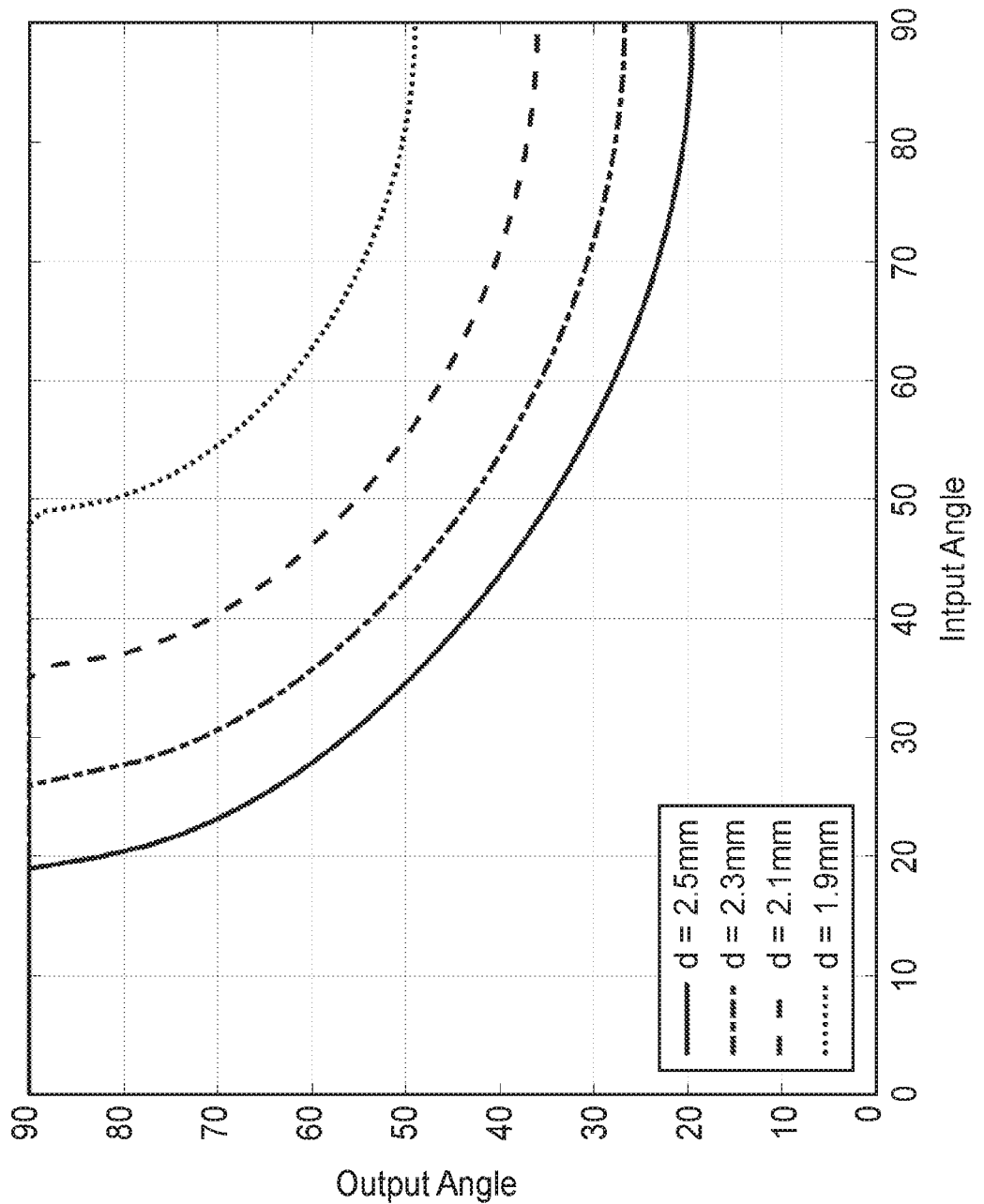
FIG. 9 is a graph showing the locus of angles for various element spacing for the alternative type ternary array, with an incremental phase shift of $-2\pi/3$.

For example, FIG. 8 shows the locus of angles for various element spacing for the first type ternary array with an incremental phase shift of $2\pi/3$. In this example, if the input angle is 50 degrees and the distance between element is d=1.5 mm, then the output angle of this ternary array will be 20 degrees. In another example, FIG. 9 shows the locus of angles for various element spacing for the alternative type ternary array, with an incremental phase shift of $4\pi/3$. In this alternative example, if the input angle is 70 degrees and the inter element distance is d=2.3 mm, then the output angle will be 30 degrees.

One benefit in using higher order array is that as the order of the repeater device increases, the output angle becomes less variable with the change in frequency. Consider a p-order passive array, designed to produce an output angle $\theta_o$ from a plane wave of frequency f (wavelength $\lambda=c/f$ where c is the speed of light) and incident angle $\theta_i$. EQ.8.1 gives the relationships between the parameters of the repeater device. By taking the derivative of EQ.8.1, it follows that the change in output angle 400 is related to percentage change in frequency (Δf/f) by:

$$\Delta\theta_0 = -\frac{1}{\cos\theta_0}\frac{\lambda}{pd}\frac{\Delta f}{f} \qquad \text{(EQ. 10)}$$

EQ.10 show that the variation in the output angle with respect to the percentage change in frequency is smaller the higher the order of the repeater array.

Figure 11:
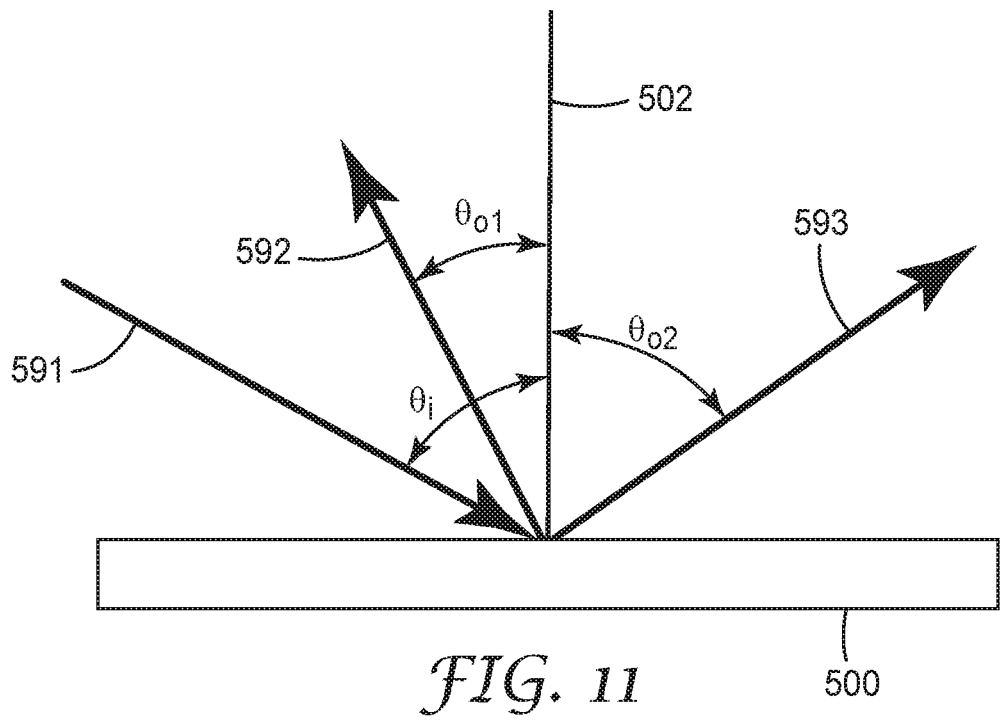
FIG. 11 is a schematic view of an exemplary incident beam and several beams at different angles redirected by a repeater device.

FIG. 11 is a schematic cross section showing the angle conventions used herein. The normal 502 to the plane of the repeater device 500 is used to define the reference angle, the 0 angle. Angles to the left of the reference angle are negative angles and angles to the right of the reference angle are positive angles. FIG. 11 shows a beam incident on the array plane 500 at angle $\theta_i$. The repeater device creates two output beams 592 and 593, having respective angles $\theta_{o1}$ and $\theta_{o2}$; and by the angle convention, $\theta_{o1}$ is a negative angle and $\theta_{o2}$ is a positive angle.

FIG. 4A shows a simulated reflective pattern of an exemplary binary array. In the simulation, dx=dy=2.5 mm, a plane wave of 60 GHz is incident on the binary array at the angle of 40 degrees. The redirected beam occurs at one of the peaks in FIG. 4A at the output angle of −21 degrees. The specular component, the other peak on FIG. 4A occurs at the output angle of 40 degrees as expected. It is noticeable that the redirected component at −21 degrees is at least as strong as the specular components. As a result, this repeater device will have redirected efficiency of at least 50%. The redirected repeater device efficiency, which is the percentage of energy redirected in the non-specular desired direction can be further improved by selecting dx and dy to be smaller than 2.5 mm.

Figure 6:
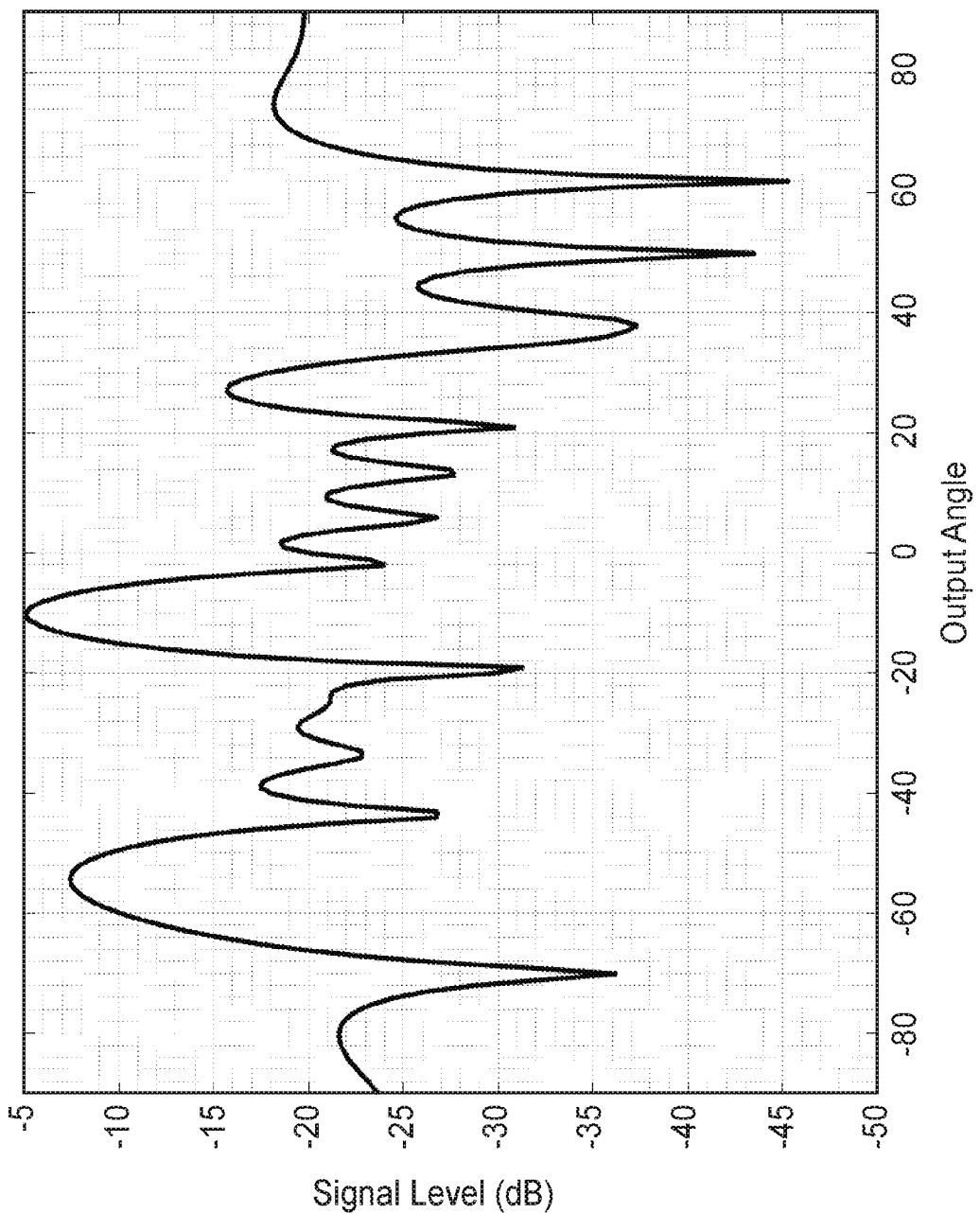
FIG. 6 is a graph showing a reflective pattern of an exemplary binary array for an incidence angle of 18 deg.

FIG. 6 shows a simulated reflective pattern of an exemplary ternary array of the type for which the phase step is 2π/3 degrees or 120 degrees. In the simulation, dx=dy=2.5 mm, a plane wave of 60 GHz is incident on the ternary array at the angle of 30 degrees. The desired redirected beam occurs at one of the peaks in FIG. 6 at the output angle of −10 degrees. Also, the ternary array introduces a signal at the angle of −54 degrees. This second signal is called a secondary Floquet Modes. Floquet Modes are plane waves emerging from periodic electromagnetic structures. It is known in the field of array design that Floquet Modes can be minimized by selecting dx and dy to be smaller than 2.5 mm, or half a wavelength at the design frequency. The specular component is significantly suppressed and it is more than 10 dB smaller than the desired signal. As a result, this ternary microwave array repeater will have redirected efficiency primarily degraded by the Floquet Modes. The redirected repeater device efficiency, which is the percentage of energy redirected in the non-specular desired direction can be further improved by minimizing Floquet Modes. This is known in the art to be accomplished by selecting dx and dy to be smaller than 2.5 mm.

In the above binary and ternary array embodiments, the array of phase shifting elements alternate along a single dimension (e.g., along the x-axis). In another embodiment of the invention, a passive array can alternate in two dimensions. A generalized two-dimensional repeater device array can be designed following the same approach described above. The array will have an incremental phase shift $\beta_{10}$ along the x-axis and the array will also have an incremental phase shift $\beta_{01}$ along the y-axis. Furthermore $2\pi/\beta_{10}$ and $2\pi/\beta_{01}$ are the periodicity along the x-axis and y-axis respectively.

Referring back to EQ.7, it is evident that:

$$\beta_{10} = \frac{2\pi \cdot d_x}{\lambda}(\sin\theta_o\cos\phi_o - \sin\theta_i\cos\phi_i) \qquad \text{EQ. 9}$$

$$\beta_{01} = \frac{2\pi \cdot d_y}{\lambda}(\sin\theta_o\sin\phi_o - \sin\theta_i\sin\phi_i)$$

The condition to maximize the exiting field in the direction $(\theta_o, \phi_o)$, from an incident field in the direction $(\theta_i, \phi_i)$ is that at the element at location nm, the required phase shift be given as:

$$\beta_{nm} = n\cdot\beta_{10} + m\cdot\beta_{01} \qquad \text{EQ. 10}$$

After $\beta_{01}$ and $\beta_{10}$, dx, dy, and λ are selected, many pairs of input angles $(\theta_i, \phi_i)$, and output angles $(\theta_o, \phi_o)$ exist which satisfy EQ.9. Thus, surfaces similar to curves of FIG. 4B are available from a single passive repeater array to be used as pairs of input and output angles.

As an example, for a two-dimensional passive repeater array, consider the case of $\beta_{10}=\pi/2$ and $\beta_{01}=\pi/3$. For this two-dimensional array, the phase lattice of the array, that is two-dimensional distribution of the phase shifts at each phase shifting element is shown in FIG. 7. This array will have a periodicity of "4" along the x-axis and a periodicity of "6" along the y-axis as shown in FIG. 7. This example is a (4, 6) periodic array. Once the phase shift is known, one can synthesize the array elements from the phase shift curve as discussed previously.

Figure 10A:
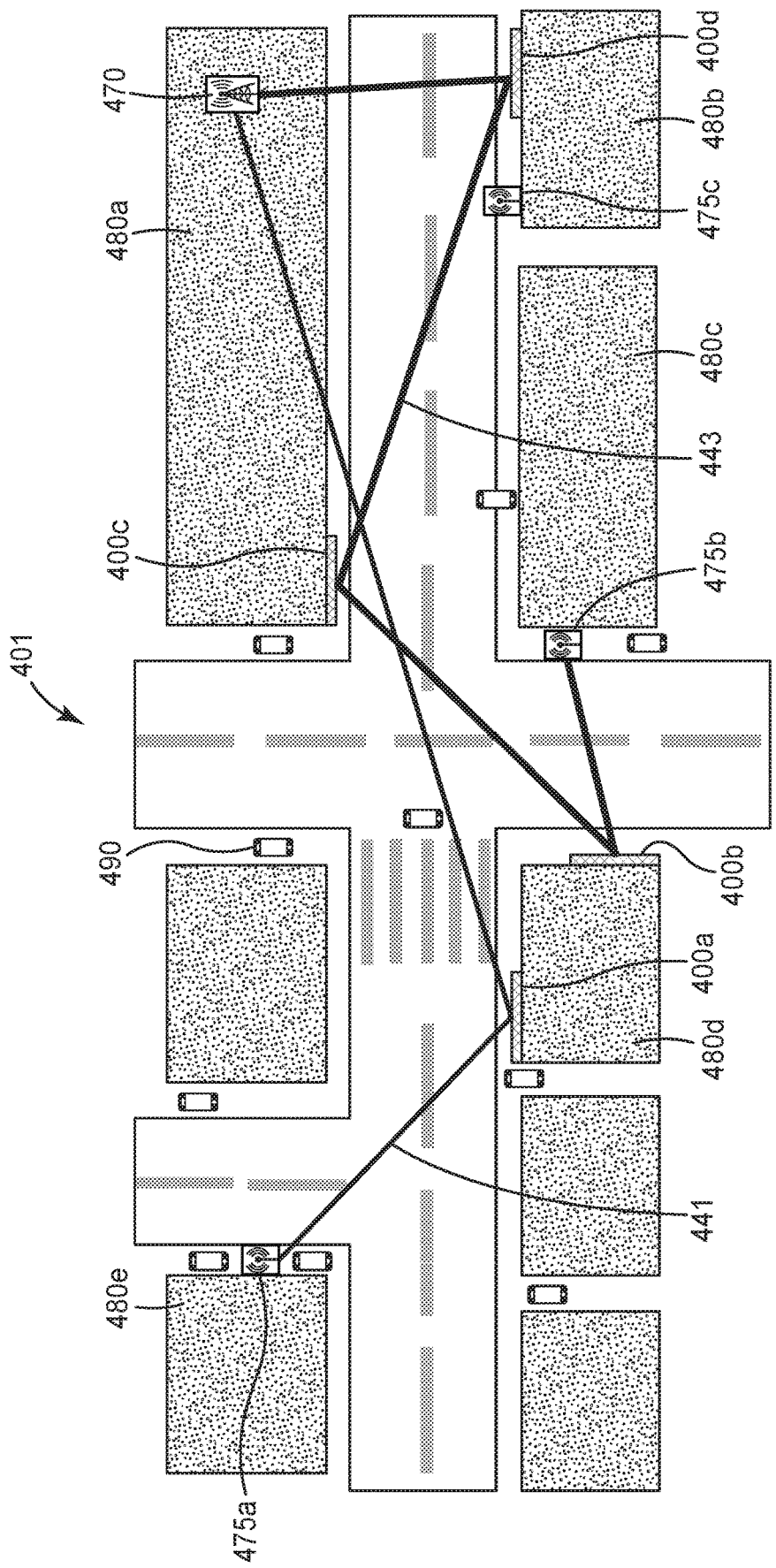
FIG. 10A is a schematic view of a wireless backhaul network that includes mobile users, small cells, and repeater devices to connect the small cells to rooftop antenna/cell sites.

The repeater devices described above can be utilized in a communication network. For example, FIG. 10A shows an exemplary network 401 deployed in a typical city environment, where a rooftop antenna 470 is deployed as a rooftop cell site (or Base Station) located on building 480a. In addition, a plurality of small cells 475a-475c are deployed in this city section to provide adequate coverage to multiple mobile users 490. In order to help provide coverage to the entire area of this city section, a series of repeater devices 400a-400d are installed on various buildings in this city section. The repeater devices 400a-400d can be constructed in a manner similar to repeater devices 100, 600, 600', 700 as described above. In addition, the above-described repeater device structure allows the repeater devices to be placed flush against an exterior wall of a building (e.g., buildings 480a, 480b, and 480d), without the need for additional mechanical structures to hold and tilt the repeater devices at a particular angle with respect to the exterior surface of the building. As such, building aesthetics can be maintained.

As mentioned above, the repeater devices can be designed to provide beam reflections at angles different from the angle of incidence. As such, this provides for greater flexibility in the positioning of repeater devices and small cells within a constricted area. For example, as shown in FIG. 10A, a small cell 475a positioned on building 480e can receive a single hop NLOS backhaul signal 441 from rooftop antenna 470 via repeater device 400a, which is positioned on the side of building 480d. In another example, a small cell 475b positioned on building 480c (which would otherwise not be accessible from rooftop antenna 470) can receive a multiple hop backhaul NLOS signal 443 from rooftop antenna 470 via repeater devices 400b-400d, which are positioned on the sides of different buildings 480d, 480a, and 480b, respectively. In this manner, multiple mobile users 490 can receive strong network signals at many different locations.

Figure 10B:
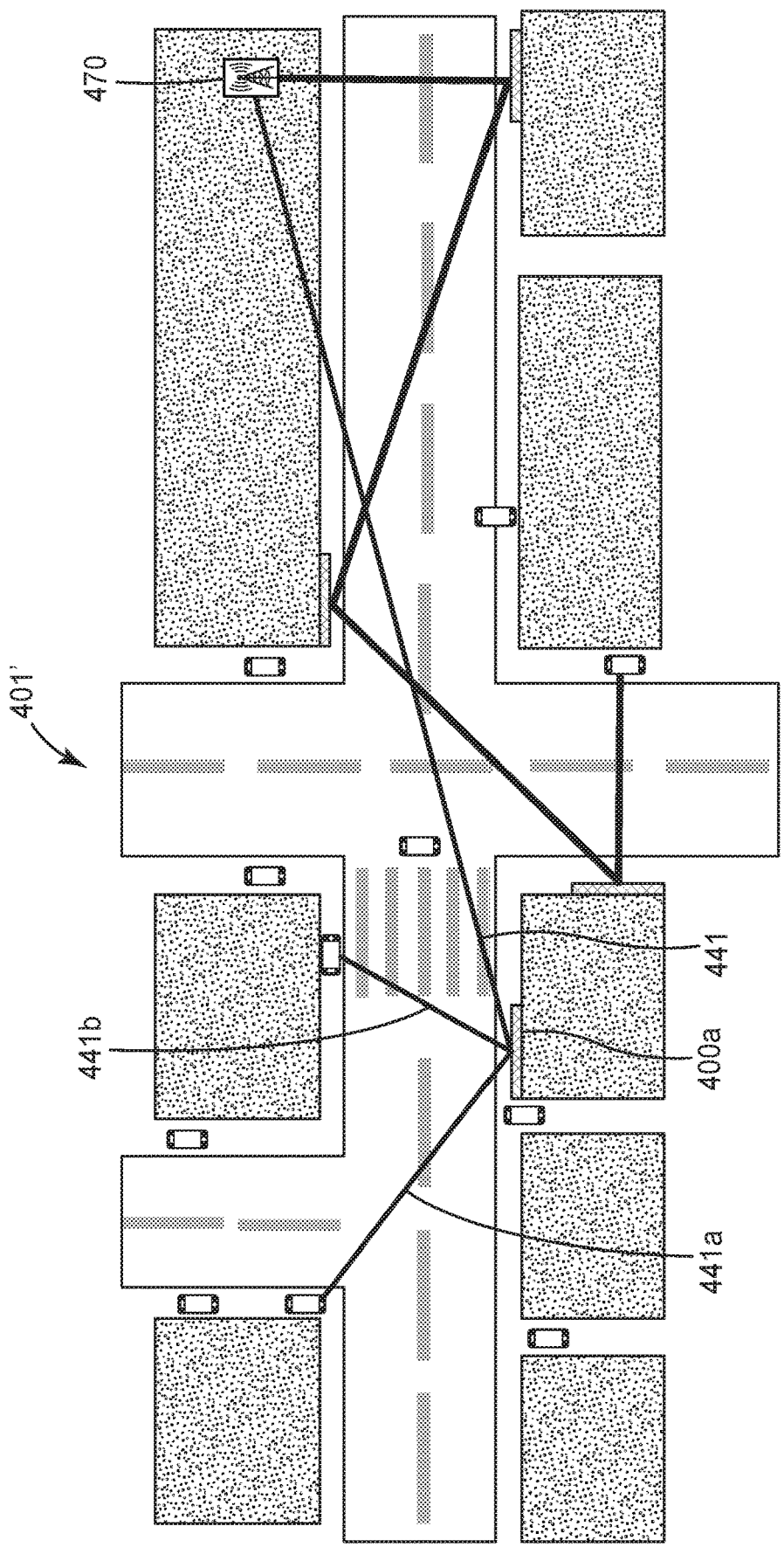
FIG. 10B is a schematic view of a portion of a wireless backhaul network without small cells, showing the use of multiple secondary beams.

In another example network implementation, shown schematically in FIG. 10B, network 401' includes one or more repeater devices, such as repeater device 400a that can be designed (as described above) to provide multiple secondary reflected beams 441a, 441b, thereby further increasing network coverage in a constricted area. As can be seen from FIG. 10B, repeater devices in this mmWave network can be deployed to entirely obviate the need for small cells in at least this portion of the network.

The rooftop base station antenna 470 may include beamforming and beam steering capabilities, such that this antenna can selectively direct its beam towards a particular direction within its field of view. The base station antenna 470 can further include within its operating software the location information of the repeater devices within its field of view as well as the reflecting characteristic of these repeater devices (input and output angles and frequency of operation). During the planning and deployment phases of the network commissioning, the repeater devices can be selectively located at locations on buildings such as to provide comprehensive coverage to the area served by the base station.

A mobile device requesting services may do so by requesting services to the base station antenna using traditional low frequency cellular frequencies such as 700 MHz to 3 GHz, which are not blocked by obstruction. Within this service request, the mobile device/user can inform the base station antenna 470 of the mobile device position within the area served by the base station antenna 470. Location information of mobile users in currently widely available from GPS receivers built onto the mobile device. In the case where the mobile user is requesting a bandwidth intensive transmission service, the base station antenna may then select to service the mobile user using mmWave frequency where extensive bandwidth is available.

With the awareness of the location of mobile user, the base station antenna can determine which repeater device is in direct view of the mobile user. In the example of FIG. 10B, the Base Station Antenna 470 determines that the repeater device 400a is in direct view of the mobile users requesting bandwidth intensive services. The base station antenna will then steer its mmWave beam towards 400a. Repeater 400a splits this beam into reflected beams 441b and 441a to provide high bandwidth service to mobile users. This technique as described herein, can eliminate the need to deploy small cells at street level close to mobile users, can enhance further user experience, and can moreover reduce network deployment cost.

Thus, the present description provides a network designer the ability to create one or more, or a series of, specifically tailored passive repeater devices depending on the operating environment. In particular, a method of forming a passive repeater device for changing the direction of a beam of microwave radiation comprises selecting values for a plurality of operating parameters of the repeater device. As described above, the operating parameters can comprise the frequency of operation, the input angle ($\theta_i$, $\phi_i$), the output angle ($\theta_o$, $\phi_o$), and the size N*dx times M*dy of the repeater device. A periodic array of alternating phase shift elements can be designed, where a phase shifting element can have dimensions dx and dy, where dx and dy are less than or equal to half the wavelength of a frequency of operation. The phase shifting elements further provide a reflection phase shift variable from 0 to at least $2\pi$ when a geometric parameter of the phase shifting elements is varied. The repeater device can be formed by placing an array of N times M phase shifting elements on a substrate, where a phase shift provided by a respective phase shifting element at a given position in the array is selected such that the array redirects the beam of microwave radiation from an input angle ($\theta_i$, $\phi_i$) to an output angle ($\theta_o$, $\phi_o$).

EMBODIMENTS

Various embodiments are provided.

Embodiment 1A is a repeater device comprising a periodic array of alternating metallic phase shifting elements, the array being periodic in at least one axis, formed on a first surface of a dielectric substrate, with an opposite surface of the dielectric substrate having a ground plane formed thereon, wherein each phase shifting element provides from 0° to 360° phase shifting in the microwave frequency range.

Embodiment 2A is the repeater device of embodiment 1A, wherein a first phase shifting element includes a first two-dimensional geometric structure and a second phase shifting element includes a second two-dimensional geometric structure, wherein the first and second two-dimensional geometric structures each have a similar shape, and wherein the first two-dimensional geometric structure has a different size than the second two-dimensional geometric structure.

Embodiment 3A is the repeater device of embodiment 1A, wherein the periodic array comprises an array of repeating trios of phase shifting elements in at least one axis, wherein a trio of phase shifting elements comprises a first phase shifting element having a first two-dimensional geometric structure, a second phase shifting element having a second two-dimensional geometric structure, and a third phase shifting element having a third two-dimensional geometric structure, wherein the first, second, and third two-dimensional geometric structures each have a similar shape, and wherein the first two-dimensional geometric structure has a different size than the second two-dimensional geometric structure and the third two-dimensional geometric structure has a different size than the first and second two-dimensional geometric structures.

Embodiment 4A is the repeater device of embodiment 1A, wherein the periodic array comprises at least P phase shifting elements each having a similar shape and different size provided in a repeating pattern, wherein P comprises an integer greater than 2.

Embodiment 5A is the repeater device of any of the preceding embodiments, wherein the ground plane comprises a metallic material, and the phase shifting elements each comprise a metallic patch having a two-dimensional geometric structure.

Embodiment 6A is the repeater device of embodiment 2A, wherein the first and second two-dimensional geometric structures each comprise a metallic ring having a plus shape disposed in a central region thereof.

Embodiment 7A is the repeater device of embodiment 2A, wherein the first and second two-dimensional geometric structures each comprise a triangle.

Embodiment 8A is the repeater device of embodiment 1A, wherein the dielectric substrate comprises a stretchable material.

Embodiment 9A is the repeater device of embodiment 8A, wherein the dielectric substrate comprises a multi-layer structure that includes the stretchable material.

Embodiment 10A is the repeater device of embodiment 8A, wherein the stretchable material comprises a conductive fabric.

Embodiment 11A is the repeater device of embodiment 1A, further comprising a concealment layer disposed over the array of phase shifting elements.

Embodiment 12A is the repeater device of embodiment 1A, wherein the phase shifting elements and ground plane are formed from transparent conductors, and the dielectric substrate is formed from a transparent material.

Embodiment 1B is a microwave network comprising one or more of the repeater devices of embodiment 2A.

Embodiment 2B is a microwave network comprising one or more of the repeater devices of embodiment 3A.

Embodiment 3B is a microwave network of embodiment 1B, wherein the one or more repeater devices are disposed in an access portion of a cellular network.

Embodiment 4B is a microwave network of embodiment 1B, wherein the one or more repeater devices are disposed in a backhaul portion of a cellular network.

Embodiment 5B is a microwave network of embodiment 1B, wherein at least one or more repeater devices are flush mounted to an exterior wall of a building.

Embodiment 1C is a method of forming a repeater device for changing the direction of a beam or microwave radiation, comprising: selecting values for a plurality of operating parameters of the repeater device, the operating parameters comprising frequency of operation, input angle ($\theta_i$, $\phi_i$), output angle ($\theta_o$, $\phi_o$), and a size N*dx times M*dy of the repeater device; providing a phase shifting element having dimensions dx and dy, where dx and dy are less than or equal to half the wavelength of a frequency of operation, wherein the phase shifting element further provides a reflection phase shift variable from 0 to at least $2\pi$ when a geometric parameter of the phase shifting element is varied; and placing an array of N times M phase shifting elements on a substrate to form the repeater device, wherein a phase shift provided by a respective phase shifting element at a given position in the array is selected such that the array redirects the beam of microwave radiation from an input angle ($\theta_i$, $\phi_i$) to an output angle ($\theta_o$, $\phi_o$).

Embodiment 2C is the method of embodiment 1C wherein each repeater device includes a ground plane comprising a metallic material, and wherein each phase shifting element comprises a metallic patch having a two-dimensional geometric shape.

Embodiment 3C is the method of embodiment 2C, wherein the two-dimensional geometric shape comprises a metallic ring having a plus shape disposed in a central region thereof.

Embodiment 4C is the method of embodiment 3C, wherein a phase shifting element includes a first two-dimensional geometric shape and a second two-dimensional geometric shape being different that the first two-dimensional geometric shape.

Various modifications, equivalent processes, as well as numerous structures to which the present invention may be applicable will be readily apparent to those of skill in the art to which the present invention is directed upon review of the present specification.

We claim:

1. A microwave network comprising one or more repeater devices, the one or more repeater devices, comprising:
a periodic array of alternating metallic phase shifting elements, the array being periodic in at least one axis, formed on a first surface of a dielectric substrate, with an opposite surface of the dielectric substrate having a ground plane formed thereon, wherein each phase shifting element provides from 0° to 360° phase shifting in a microwave frequency range,
wherein a first phase shifting element of the periodic array includes a first two-dimensional geometric structure and a second phase shifting element of the periodic array includes a second two-dimensional geometric structure, wherein the first and second two-dimensional geometric structures each have a same shape, and wherein the first two-dimensional geometric structure has a different size than the second two-dimensional geometric structure,
wherein the one or more repeater devices are disposed in a backhaul portion of a cellular network.

2. The repeater device of claim 1, wherein the periodic array comprises at least P phase shifting elements each having a same shape and different size provided in a repeating pattern, wherein P comprises an integer greater than 2.

3. The repeater device of claim 1, wherein the ground plane comprises a metallic material, and the phase shifting elements each comprise a metallic patch having a two-dimensional geometric structure.

4. The repeater device of claim 1, wherein the first and second two-dimensional geometric structures each comprise a metallic ring having a plus shape disposed in a central region thereof.

5. The repeater device of claim 1, wherein the first and second two-dimensional geometric structures each comprise a triangle.

6. The repeater device of claim 1, wherein the dielectric substrate comprises a multi-layer structure that includes a stretchable material.

7. The repeater device of claim 6, wherein the stretchable material comprises a conductive fabric.

8. The repeater device of claim 1, further comprising a concealment layer disposed over the array of phase shifting elements.

9. The repeater device of claim 1, wherein the phase shifting elements and ground plane are formed from transparent conductors and the dielectric substrate is formed from a transparent dielectric material.

10. The microwave network of claim 1, wherein the one or more repeater devices are disposed in an access portion of a cellular network.

11. A repeater device, comprising:
a periodic array of alternating metallic phase shifting elements, the array being periodic in at least one axis, formed on a first surface of a dielectric substrate, with an opposite surface of the dielectric substrate having a ground plane formed thereon, wherein each of the phase shifting elements provides from 0° to 360° phase shifting in a microwave frequency range,
wherein the periodic array comprises an array of repeating trios of phase shifting elements in at least one axis, wherein a trio of the phase shifting elements comprises a first phase shifting element having a first two-dimensional geometric structure, a second phase shifting element having a second two-dimensional geometric structure, and a third phase shifting element having a third two-dimensional geometric structure, wherein the first, second, and third two-dimensional geometric structures each have a same shape, and
wherein the first two-dimensional geometric structure has a different size than the second two-dimensional geometric structure and the third two-dimensional geometric structure has a different size than the first and second two-dimensional geometric structures.

12. A microwave network comprising one or more of the repeater devices of claim 11.

13. A method of forming a repeater device for changing the direction of a beam or microwave radiation, the method comprising:
- selecting values for a plurality of operating parameters of the repeater device, the operating parameters comprising a frequency of operation, an input angle ($\theta_i$, $\phi_i$), an output angle ($\theta_o$, $\phi_o$), and a size N*dx times M*dy of the repeater device;
- providing a phase shifting element having dimensions dx and dy, where dx and dy are less than or equal to half the wavelength of the frequency of operation, wherein the phase shifting element further provides a reflection phase shift variable from 0 to at least $2\pi$ when a geometric parameter of the phase shifting element is varied; and
- placing an array of N times M phase shifting elements on a substrate to form the repeater device, wherein a phase shift provided by a respective phase shifting element at a given position in the array is selected such that the array redirects the beam of microwave radiation from the input angle ($\theta_i$, $\phi_i$) to the output angle ($\theta_o$, $\phi_o$),
- wherein a phase shifting element includes a first two-dimensional geometric shape and a second two-dimensional geometric shape being different than the first two-dimensional geometric shape.

14. The method of claim 13, wherein the repeater device includes a ground plane comprising a metallic material, and wherein the phase shifting element comprises a metallic patch having a two-dimensional geometric shape.

15. The method of claim 14, wherein the two-dimensional geometric shape comprises a metallic ring having a plus shape disposed in a central region thereof.

* * * * *

UNITED STATES PATENT AND TRADEMARK OFFICE
CERTIFICATE OF CORRECTION

Page 1 of 1

PATENT NO. : 11,177,577 B2
APPLICATION NO. : 16/475165
DATED : November 16, 2021
INVENTOR(S) : Constand Yemelong It is certified that error appears in the above-identified patent and that said Letters Patent is hereby corrected as shown below:

In the Claims

Column 19
Line 2, Claim 13, delete "beam or microwave radiation" and insert -- beam of microwave radiation --, therefor.

Signed and Sealed this
Nineteenth Day of July, 2022

Katherine Kelly Vidal
*Director of the United States Patent and Trademark Office*